United States Patent
Reilly et al.

(10) Patent No.: US 10,540,601 B2
(45) Date of Patent: Jan. 21, 2020

(54) SYSTEM AND METHOD FOR AUTOMATED BAYESIAN NETWORK-BASED INTERVENTION DELIVERY

(71) Applicant: Pearson Education, Inc., New York, NY (US)

(72) Inventors: Amy Reilly, Dripping Springs, TX (US); Paul Grudnitski, Torrance, CA (US); Michael Young, San Antonio, TX (US)

(73) Assignee: PEARSON EDUCATION, INC., New York, NY (US)

( * ) Notice: Subject to any disclaimer, the term of this patent is extended or adjusted under 35 U.S.C. 154(b) by 123 days.

(21) Appl. No.: 15/885,119

(22) Filed: Jan. 31, 2018

(65) Prior Publication Data

US 2018/0314966 A1 Nov. 1, 2018

Related U.S. Application Data

(60) Provisional application No. 62/492,007, filed on Apr. 28, 2017.

(51) Int. Cl.
*G06N 7/00* (2006.01)
*H04L 12/26* (2006.01)

(52) U.S. Cl.
CPC ........... *G06N 7/005* (2013.01); *H04L 43/065* (2013.01); *H04L 43/16* (2013.01)

(58) Field of Classification Search
CPC ................................. G06N 20/00; G06N 5/02
See application file for complete search history.

(56) References Cited

U.S. PATENT DOCUMENTS

| | | |
|---|---|---|
| 2004/0265784 A1 | 12/2004 | Stout |
| 2005/0123893 A1 | 6/2005 | Stout et al. |
| 2005/0222799 A1 | 10/2005 | Bolt et al. |
| 2006/0112057 A1* | 5/2006 | Lai ..................... G06N 7/005 706/47 |
| 2011/0117534 A1 | 5/2011 | Berger et al. |
| 2014/0279727 A1 | 9/2014 | Baraniuk et al. |
| 2015/0170536 A1 | 6/2015 | Lan et al. |

(Continued)

OTHER PUBLICATIONS

Chen, Y. "Improving Student Model for Individualized Learning"; Universite Pierre et Marie Curie; Publication [online]. Sep. 29, 2015 [retrieved Mar. 22, 2018]. Retrieved from the Internet: <URL: http:I/www.theses.fr/2015PA066655.pdf>; pp. 11-108.

*Primary Examiner* — Bryan Lee
(74) *Attorney, Agent, or Firm* — Quarles and Brady LLP

(57) ABSTRACT

Systems and methods for automated node status determination are disclosed herein. The system can include a memory. The memory can include a Q-matrix that can include data identifying a relationship between at least a portion of a standard and at least one item of an assessment. The system can include at least one server. The at least one server can provide a first interim assessment including a first plurality of items. Each of the items can correspond to a child evidence node in a Bayesian network. The at least one server can generate first evidence by evaluating responses received to the first plurality of items from the first interim assessment and can calculate a mastery probability according to the Bayesian network of at least one parent node in the Bayesian network based on the generated first evidence.

18 Claims, 17 Drawing Sheets

(56) References Cited

U.S. PATENT DOCUMENTS

2016/0005323 A1     1/2016   Nkambou et al.
2016/0321050 A1   11/2016   Compton et al.
2018/0151083 A1*   5/2018   Yoo ........................ G09B 5/065

* cited by examiner

SYSTEM AND METHOD FOR AUTOMATED BAYESIAN NETWORK-BASED INTERVENTION DELIVERY

CROSS-REFERENCES TO RELATED APPLICATIONS

This application claims the benefit of U.S. Provisional Application No. 62/492,007, filed on Apr. 28, 2017, and entitled "METHOD AND SYSTEM FOR BAYESIAN NETWORK-BASED STANDARD OR SKILL MASTERY DETERMINATION USING A COLLECTION OF INTERIM ASSESSMENTS", the entirety of which is hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

SUMMARY

One aspect of the present disclosure relates to a system for automated node status determination. The system includes a memory containing a Q-matrix including data identifying a relationship between at least a portion of a standard and at least one item of an assessment. The system can include at least one server. The at least one server can: provide a first interim assessment including a first plurality of items, each of which items can correspond to a child evidence node in a Bayesian network; generate first evidence by evaluating responses received to the first plurality of items from the first interim assessment; and calculate a mastery probability according to the Bayesian network of at least one parent node in the Bayesian network based on the generated first evidence.

In some embodiments, the at least one server can: provide a second interim assessment including a second plurality of items, each of which items corresponds to a child evidence node in the Bayesian network; generate second evidence by evaluating responses received to the second plurality of items; and calculate an updated mastery probability according to the Bayesian network of the at least one parent node in the Bayesian network based on the generated first evidence and the generated second evidence. In some embodiments, the at least one parent node corresponds to at least a portion of a skill.

In some embodiments, the at least one processor can determine skill mastery based on the calculated mastery probability. In some embodiments, determining skill mastery based on the calculated mastery probability includes comparing the calculated mastery probability to a threshold and identifying the at least a portion of the skill associated with the at least one parent node as mastered when the mastery probability exceeds the threshold. In some embodiments, skill mastery is determined without a summative assessment. In some embodiments, skill mastery is determined from a plurality of interim assessments. In some embodiments, skill mastery is not determined by a single summative assessment.

In some embodiments, the at least one server can: determine non-mastery of a standard; determine existence of the second interim assessment; select the second interim assessment; calculate a first mastery probability for a first parent node associated with the first interim assessment; calculate a second mastery probability for a second parent node associated with the second interim assessment; and determine mastery of the standard based on the first and second mastery probabilities. In some embodiments, determining the mastery of the standard is further based on additional mastery probabilities associated with additional parent nodes. In some embodiments, the skill can be a standard.

One aspect of the present disclosure relates to a method for determining mastery of a skill. The method includes: providing a first interim assessment including a first plurality of items, each of which items corresponds to a child evidence node in a Bayesian network; generating first evidence by evaluating responses received to the first plurality of items from the first interim assessment; and calculating a mastery probability according to the Bayesian network of at least one parent node in the Bayesian network based on the generated first evidence.

In some embodiments, the method includes: providing a second interim assessment including a second plurality of items, each of which items corresponds to a child evidence node in the Bayesian network; generating second evidence by evaluating responses received to the second plurality of items; and calculating an updated mastery probability according to the Bayesian network of the at least one parent node in the Bayesian network based on the generated first evidence and the generated second evidence. In some embodiments, the at least one parent node corresponds to at least a portion of the skill.

In some embodiments, the method includes determining skill mastery based on the calculated mastery probability. In some embodiments, determining skill mastery based on the calculated mastery probability includes comparing the calculated mastery probability to a threshold and identifying the at least a portion of the skill associated with the at least one parent node as mastered when the mastery probability exceeds the threshold. In some embodiments, skill mastery is determined without a summative assessment.

In some embodiments, skill mastery is determined from a plurality of interim assessments, and In some embodiments, the skill can be a standard. In some embodiments, skill mastery is not determined by a single summative assessment. In some embodiments, the method includes: determining non-mastery of a standard; determining existence of the second interim assessment; selecting the second interim assessment; calculating a first mastery probability for a first parent node associated with the first interim assessment; calculating a second mastery probability for a second parent node associated with the second interim assessment; and determining mastery of the standard based on the first and second mastery probabilities.

One aspect of the present disclosure relates to a system for automated Bayesian network-based intervention delivery. The system includes: a memory containing a Q-matrix including data identifying a relationship between at least a portion of a standard and at least one item of an assessment. The system can include at least one server. The at least one server can: identify a user; retrieve user data; provide a first interim assessment including a first plurality of items, each of which items corresponds to a child evidence node in a Bayesian network; calculate a mastery probability of at least one parent node of the child evidence node based on generated first evidence and according to the Q-matrix; and generate and deliver an intervention when the mastery probability of the at least one parent node drops below a predetermined value.

In some embodiments, the predetermined value can include an intervention threshold. In some embodiments, the at least one server can: retrieve the intervention threshold; and compare the mastery probability to the intervention threshold. In some embodiments, the at least one parent node corresponds to at least a portion of a skill. In some embodiments, the intervention can include at least one instructional unit. In some embodiments, the at least one server can generate a mastery report.

In some embodiments, the mastery report identifies the parent node for which the user did not achieve mastery. In some embodiments, the mastery report includes a mastery window identifying the user and including at least one icon identifying a mastery of the user. In some embodiments, the mastery window further includes an identifier of a portion of a standard associated with the at least one icon identifying the mastery of the user. In some embodiments, the mastery of the user corresponds to the mastery probability of the user. In some embodiments, the mastery report comprises a link directing launch of a mastery interface.

One aspect of the present disclosure relates to a method for automated Bayesian network-based intervention delivery. The method includes: identifying a user with at least one server; retrieving user data from a user profile database in memory coupled with the at least one server; providing with the at least one server a first interim assessment including a first plurality of items, each of which items corresponds to a child evidence node in a Bayesian network; calculating with the at least one server a mastery probability of at least one parent node of the child evidence node based on generated first evidence and according to a Q-matrix including data identifying a relationship between at least a portion of a standard and at least one item of an assessment; and generating and delivering with the at least one server an intervention when the mastery probability of the at least one parent node drops below a predetermined value.

In some embodiments, the predetermined value can be an intervention threshold, and the at least one server can: retrieve the intervention threshold; and compare the mastery probability to the intervention threshold. In some embodiments, the at least one parent node corresponds to at least a portion of a skill. In some embodiments, the intervention can include at least one instructional unit.

In some embodiments, the method includes generating a mastery report. In some embodiments, the mastery report identifies the parent node for which the user did not achieve mastery. In some embodiments, the mastery report can include a mastery window identifying the user and comprising at least one icon identifying a mastery of the user. In some embodiments, the mastery window further includes an identifier of a portion of a standard associated with the at least one icon identifying the mastery of the user. In some embodiments, the mastery of the user corresponds to the mastery probability of the user. In some embodiments, the mastery report can include a link directing launch of a mastery interface.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
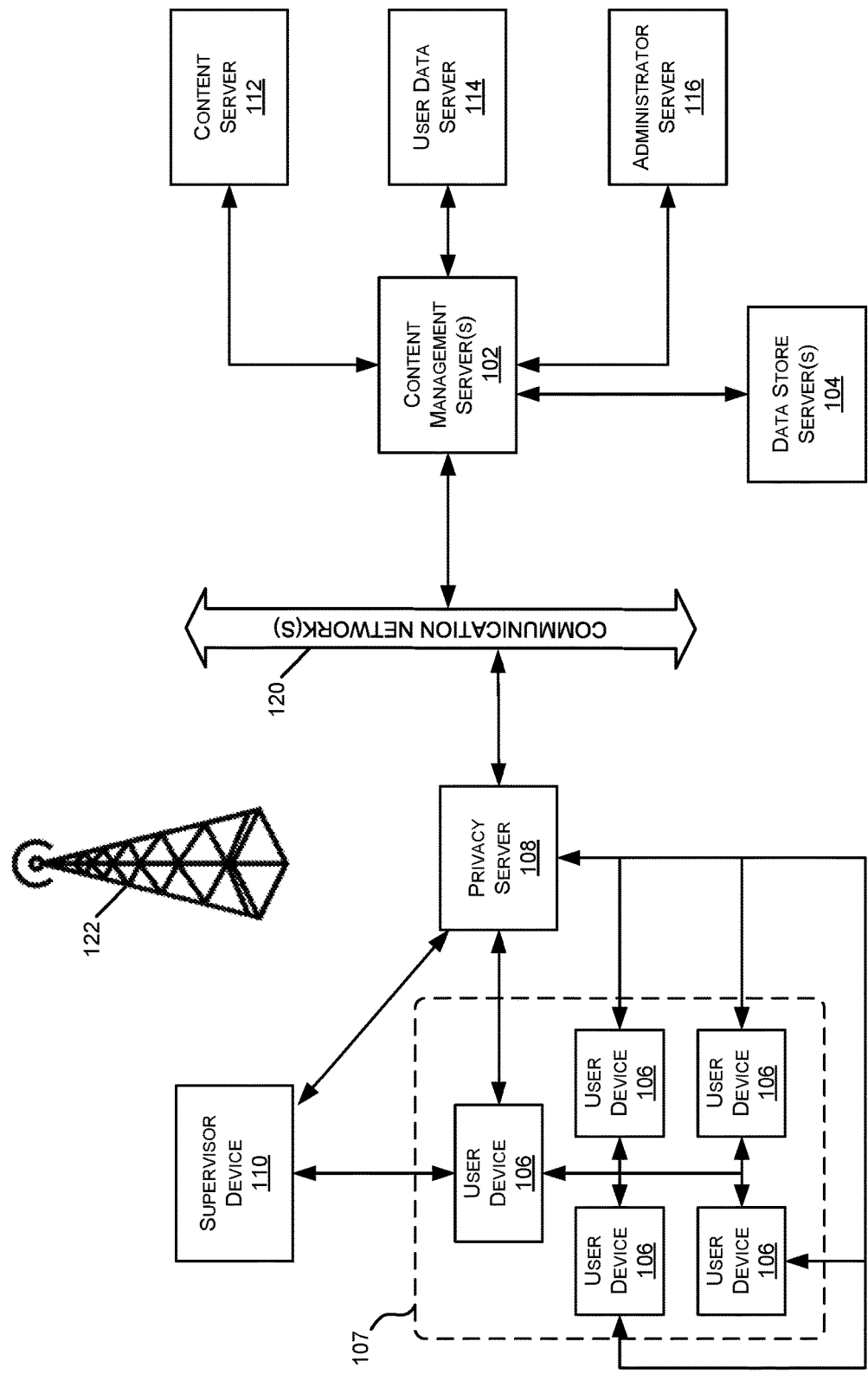
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, also referred to herein as "databases", such as database servers and/or file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more survey servers 119. The survey server 119 may include hardware and software components to generate, store, and maintain the survey resources for distribution to user devices 106 and other devices in the network 100. In some embodiments, the survey server 119 can send survey information to one or several of the user devices 106 and/or receive survey information from one or several of the user devices 106.

In some embodiments, the survey server 119 can be configured to generate and/or aggregate one or several surveys based on questions received from a user device 106 and/or a supervisor device 110. In some embodiments, the survey server 119 can be configured to generate and/or aggregate one or several surveys based on questions stored in a database in the database server 104.

In some embodiments, the survey server 119 can be configured to receive, sort, and/or analyze some or all of the survey information received from the one or several user devices 106. In some embodiments, the survey server 119 can receive the survey information, classify the survey information, and direct the storage of the survey information within one or several of the databases of the database server 104 according to one or several attributes of the survey information. In some embodiments, these one or several attributes can, for example, relate to whether the survey information is of the type used for providing real-time feedback, or of the type that is not used for providing real-time feedback.

By way of example, in some embodiments, survey information can be received during, for example, a lecture, a class, or the like, and can be used to affect a portion of that lecture, class, or the like. In such an embodiment, the survey information can be analyzed to determine the effectiveness of the lecture, the class, or the like and feedback can be provided during the lecture, class, or the like based on the analysis of the survey data. As used herein, feedback is provided in real-time if feedback is provided before the completion of the lecture, class, or the like from which survey data was collected upon which the feedback is based.

In such an embodiment in which real-time feedback is desired, the speed with which the survey data is accessible and analyzable can determine whether timely, real-time feedback can be provided. Thus, in some embodiments, such survey information for which timely, real-time feedback may be desired can be directed for storage in a database located in a tier 0 or tier 1 memory, and survey information for which real-time feedback is not desired may be directed for storage in a database located in a lower tier memory.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can be identified as being part of the back-end components 122. The back-end components 122 can include, for example, the content management server 102, the database server 1204, the privacy server 108, the content server 112, the user data server 114, the administrator server 116, and/or the communication network 120.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 124.

In some embodiments, navigation system 124 can include or several features that can communicate with one or several components of the content distribution network 100 including, for example, with one or several of the user devices 106 and/or with one or several of the supervisor devices 110. In some embodiments, this communication can include the transmission of a signal from the navigation system 124 which signal is received by one or several components of the content distribution network 100 and can be used to determine the location of the one or several components of the content distribution network 100.

Figure 2:
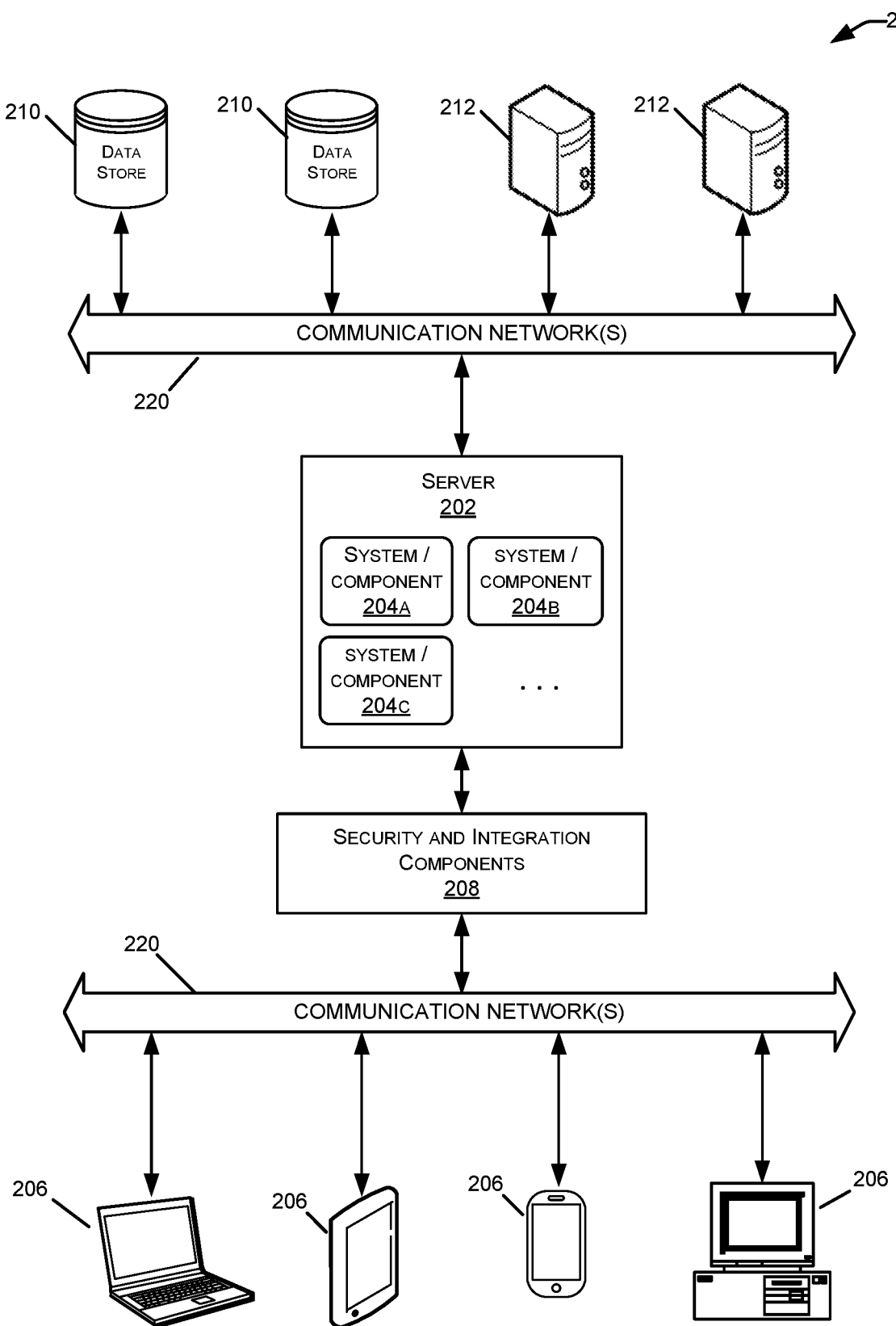
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN), or may use storage-as-a-service (STaaS) architectural model. In some embodiments, the computing environment can be replicated for each of the networks 107, 122, 104 discussed with respect to FIG. 1 above.

Figure 3:
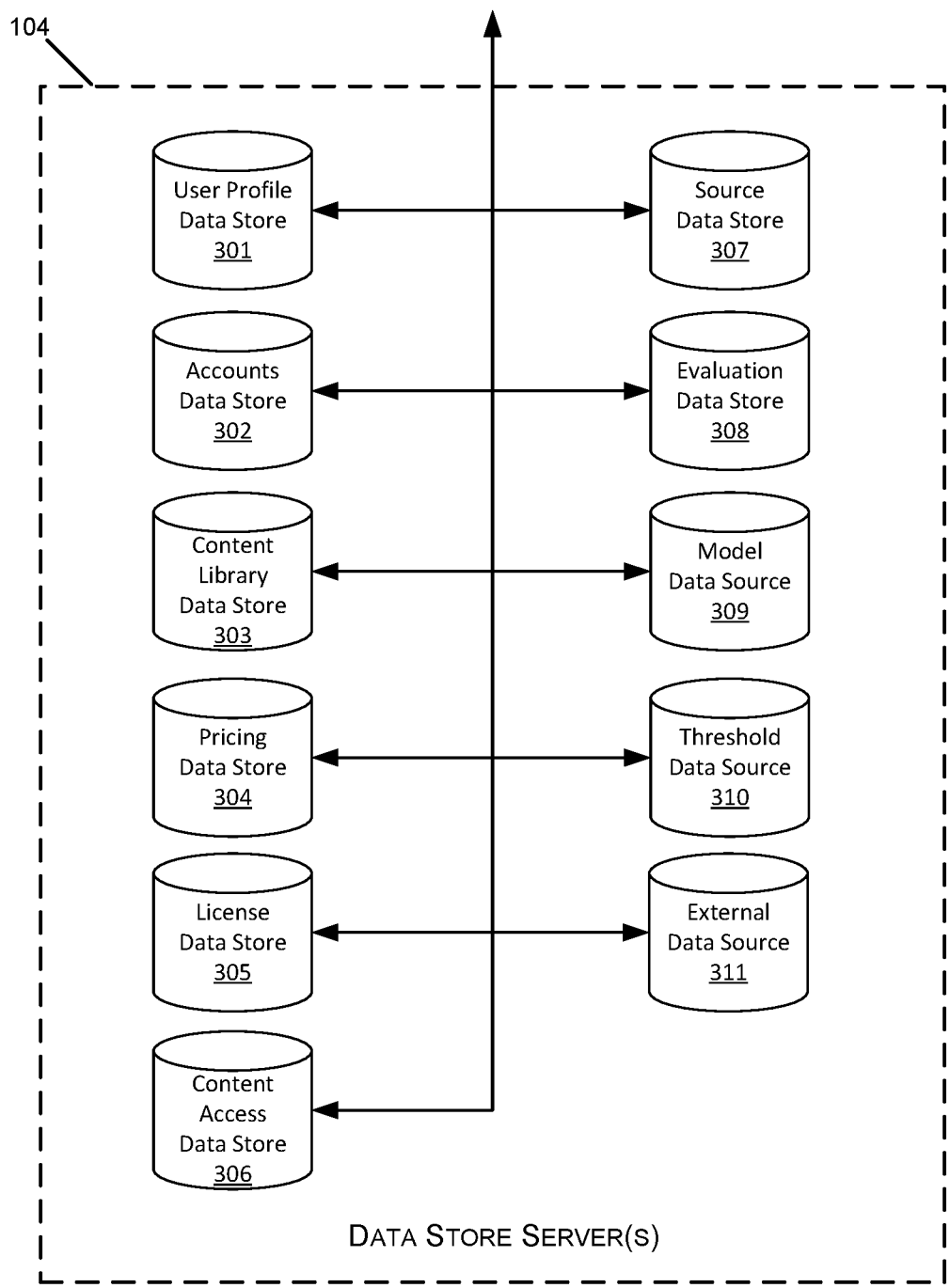
FIG. 3 is a block diagram illustrating an embodiment of one or more data store servers within a content distribution network.

With reference to FIG. 3, an illustrative set of databases and/or database servers is shown, corresponding to the databases servers 104 of the content distribution network 100 discussed above in FIG. 1. One or more individual databases 301-312 may reside in storage on a single computer server 104 (or a single server farm or cluster) under the control of a single entity, or may reside on separate servers operated by different entities and/or at remote locations. In some embodiments, databases 301-312 may be accessed by the content management server 102 and/or other devices and servers within the network 100 (e.g., user devices 106, supervisor devices 110, administrator servers 116, etc.). Access to one or more of the databases 301-312 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-312, including their functionality and types of data stored therein, are illustrative and non-limiting. Database server architecture, design, and the execution of specific databases 301-312 may depend on the context, size, and functional requirements of a content distribution network 100. For example, in content distribution systems 100 used for professional training and educational purposes, separate databases or file-based storage systems may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile data store 301, also referred to herein as a user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several individuals, content authors, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, this information can identify one or several user memberships in one or several groups such as, for example, an individual's membership in a university, school, program, grade, course, class, or the like. In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to a student's academic and/or educational history. This information can identify one or several courses of study that the individual has initiated, completed, and/or partially completed, as well as grades received in those courses of study. In some embodiments, the individual's academic and/or educational history can further include information identifying individual performance on one or several evaluations, quizzes, and/or assignments. In some embodiments, this information can be stored in a tier of memory that is not the fastest memory in the content distribution network 100.

The user profile database 301 can include information relating to one or several student learning preferences. In some embodiments, for example, the user, also referred to herein as the student, the student-user, or as the recipient-user, may have one or several preferred learning styles, one or several most effective learning styles, and/or the like. In some embodiments, the individual's learning style can be any learning style describing how the individual best learns or how the individual prefers to learn. In one embodiment, these learning styles can include, for example, identification of the individual as an auditory learner, as a visual learner, and/or as a tactile learner. In some embodiments, the data identifying one or several individual learning styles can include data identifying a learning style based on the individual's educational history such as, for example, identifying an individual as an auditory learner when the individual has received significantly higher grades and/or scores on assignments and/or in courses favorable to auditory learners. In some embodiments, this information can be stored in a tier of memory that is not the fastest memory in the content distribution network 100.

In some embodiments, the user profile database 301 can include information relating to one or several recipient-user behaviors including, for example: attendance in one or several courses; attendance and/or participation in one or several study groups; extramural, student group, and/or club involve and/or participation, or the like. In some embodiments, this information relating to one or several recipient-user behaviors can include information relating to the recipient-users schedule.

In some embodiments, the user profile database 301 can include information identifying one or several skill levels of some or all of the users identified in the user profile database 301. In some embodiments, these skill levels can identify, for example, mastery of all or portions of a standard. This identification of mastery of all or portions of the standard can, in some embodiments, identify one or several portions of the standard where mastery has not been achieved, and can, in some embodiments, identify one or several action plans and/or remediation plans for attaining mastery of one, some, or all of those one or several portions of the standard where mastery has not been achieved.

In some embodiments, the user profile database can include a database of responses received from the user. In some embodiments, this database can include information identifying one or several received responses, information identifying the evaluation of those one or several received responses, and/or information identifying the items for which the responses were received. This database can be updated as responses are received from a user.

The user profile database 301 can further include information relating to one or several teachers, presenters, and/or instructors who are responsible for organizing, presenting, and/or managing the presentation of information to the student. In some embodiments, user profile database 301 can include information identifying courses and/or subjects that have been taught by the presenter, data identifying courses and/or subjects currently taught by the presenter, and/or data identifying courses and/or subjects that will be taught by the presenter. In some embodiments, this can include information relating to one or several teaching styles of one or several presenters. In some embodiments, the user profile database 301 can further include information indicating past evaluations and/or evaluation reports received by the presenter. In some embodiments, the user profile database 301 can further include information relating to improvement suggestions received by the presenter, training received by the presenter, continuing education received by the presenter, and/or the like. In some embodiments, this information can be stored in a tier of memory that is not the fastest memory in the content distribution network 100.

An accounts datastore 302, also referred to herein as an accounts database 302, may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library datastore 303, also referred to herein as a content library database 303, may include information describing the individual content items (or content resources or data packets) available via the content distribution network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several evaluations, one or several quizzes, one or several assignments, or the like. All or portions of the content library database can be stored in a tier of memory that is not the fastest memory in the content distribution network 100. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

The content library database 303 can, in some embodiments, include information identifying one or several standards. This information identifying one or several standards can be organized in a standards database located in the content library database 303. In some embodiments, a standard can define a plurality of subject matters and/or skills for which mastery is determined and/or measured. In some embodiments, the standard can include information identifying what mastery is and/or how mastery is achieved of these subject matters and/or skills. In some embodiments, for example, this information identifying what mastery is and/or how mastery is attained can specify one or several thresholds delineating between mastery and non-mastery of some or all of these subject matters and/or skills. In some embodiments, this information can define a minimum mastery probability to be achieved before a user is identified as achieving mastery of some or all of these subject matters and/or skills.

In some embodiments, the standard can further include information identifying and/or defining attainment and/or meeting of the standard. In some embodiments, this can identify one or several thresholds delineating between circumstances of attainment and/or meeting of the standard and circumstances of non-attainment and/or non-meeting of the standard. In some embodiments, for example, this information identifying and/or defining attainment and/or meeting of the standard can specify a number and/or percent of the subject matters and/or skills to be mastered in order for the standard to be attained and/or met.

The content library database 303 can include information identifying one or several items. These one or several items can comprise one or several questions for providing to one or several users in one or several tests. In some embodiments, responses received to these one or several questions can be evaluated and can be used as evidence of mastery of all or a portion of one or several standards. These questions can comprise, for example, one or several true/false questions, one or several multiple-choice questions, one or several essay a questions, one or several fill-in-the-blank questions, one or several short answer questions, or the like. These one or several items can be stored in an item bank, also referred to herein as an item database, a question database, or a content database. The item bank can be a sub database within the content library database 303.

The content library database 303 can include information relating to one or several instructional units. In some embodiments, and instructional unit can comprise content for providing to a user to teach a user skill and/or to develop user knowledge. Each instructional unit can include content for presenting to a recipient-user. This content can include, for example, teaching material, practice material, homework, and/or assessment material. This assessment material can include, for example, one or several interim assessments. This content can be in the form of digital written material such as written material containing one or several text strings or character strings, video content, audio content, one or several images, one or several simulations, or the like the one or several instructional units can be stored in an instructional unit database they can be, for example, a sub database within the content library database 303.

The content library database 303 can include a relational table, referred to herein as the Q-matrix. In some embodiments, the Q-matrix can include information summarizing a relationship between curricular and instructional units, and how these, both the curricular and instructional units relate to a standard. In some embodiments, the Q-matrix can include information linking the standards and/or portions thereof to instructional units and/or two items in the item bank. In some embodiments, each standard can have Q-matrix, and in other embodiments, a single Q-matrix can include multiple standards. In one embodiment, for example, the Q-matrix can link one or several interim assessments with content such as, for example, the assessment content or questions, and the Q-matrix can link the one or several interim assessments with one or several standards and/or portions of standards. As used herein, an interim assessment is an independent assessment that covers a disaggregated portion and/or a subset of the content of the cumulative assessment. In some embodiments, for example, a cumulative test may be given at the end of a course or time period, such as, for example, at the end of a grade year, to determine compliance with a standard, whereas an interim test can be given before the end of the course or time period to determine compliance with a portion of the standard. In some embodiments, the link between the interim assessment, and the one or several standards or portions of the standards can be interact, such as, for example, when the one or several interim assessments are linked to assessment content, which assessment content is likewise linked to one or several standards or portions of standards. In some embodiments, the Q-matrix can comprise a plurality of rows and a plurality of columns. In some embodiments, a standard and/or components of a standard can be identified in the rows of the Q-matrix. In some embodiments, a standard and/or components of a standard can be identified in the rows of the Q-matrix such that each portion of the standard for which mastery is determinable has a unique row. In some embodiments, the instructional units can be identified in the columns of the Q-matrix. Specifically, in some embodiments, each instructional unit relevant to the one or several standards contained in the Q-matrix can have a unique column. In some embodiments, items can be identified in a $3^{rd}$ dimension of the Q-matrix linked in the Q-matrix to both their associated row and column.

The content library database 303 can include an evidence database. In evidence database can include received responses. These responses can be organized in the evidence database according to the item for which the response was received. In some embodiments, the evidence database can further include information identifying the evaluation of the received response, the student source of the received response, or the like.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source datastore 307, also referred to herein as a source database 307, may include information relating to the source of the content resources available via the content distribution network. For example, a source database 307 may identify the authors and originating devices of content resources, previous pieces of data and/or groups of data originating from the same authors or originating devices, and the like.

An evaluation datastore 308, also referred to herein as an evaluation database 308, may include information used to direct the evaluation of users and content resources in the content management network 100. In some embodiments, the evaluation database 308 may contain, for example, the analysis criteria and the analysis guidelines for evaluating users (e.g., trainees/students, gaming users, media content consumers, etc.) and/or for evaluating the content resources in the network 100. The evaluation database 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation database 308 including data and/or instructions in the form of one or several electronic rubrics or scoring guides for use in the evaluation of the content, users, or applications. The evaluation database 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a recipient-user not achieving one or several predetermined outcomes; generate a prediction of a categorization of the recipient-user, which categorization can indicate an expected effect of one or several interventions on the recipient-user; and/or generate a prediction of a priority for any identified intervention.

In some embodiments, the risk model can comprise one or several predictive models based on, for example, one or several computer learning techniques. In some embodiments, the risk model can be used to generate a risk value for an individual, which risk value characterizes the risk of the recipient-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the recipient-user. The risk model, having received the input parameters, can then generate the risk value.

In some embodiments, the categorization model can determine a category of the recipient-user. In some embodiments, the categorization model can be used to generate one or several categorization values or identifiers that identify a category of the recipient-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the recipient-users will likely fail to achieve the desired outcome regardless of intervention, and a second group in which the recipient-users will likely achieve the desired outcome regardless of intervention. In some embodiments, the categorization model can determine the category of the recipient-user through the input of one or several parameters relevant to the recipient-user into the categorization model. In some embodiments, these parameters can be generated from one or several features or attributes of the recipient-user that can be, for example, extracted from data relating to the recipient-user.

In some embodiments, the priority model can determine a priority value, which can be a prediction of the importance of any determined intervention. In some embodiments, this priority model can be determined based on information relating to the recipient-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

In some embodiments, the model database 309 can comprise a network database. The network database can comprise information identifying a statistical model such as, for example, a probabilistic graphical model. In some embodiments, the probabilistic graphical model can comprise a probabilistic directed acyclic graphical model or a Bayesian network. In some embodiments, the Bayesian network can represent the probabilistic relationships between items in the item bank and attainment of a standard and/or mastery of a portion of the standard. In some embodiments, the items in the item bank and there linked standard(s) or portion(s) of the standard are linked by edges representative of conditional dependencies. In some embodiments, each node, which can include, for example, an item, a standard, and/or a portion of a standard, in the Bayesian network is associated with a probability function that takes, as input, a particular set of values for that nodes parent variables and gives as an output the probability of the variable represented by the node.

Figure 10:
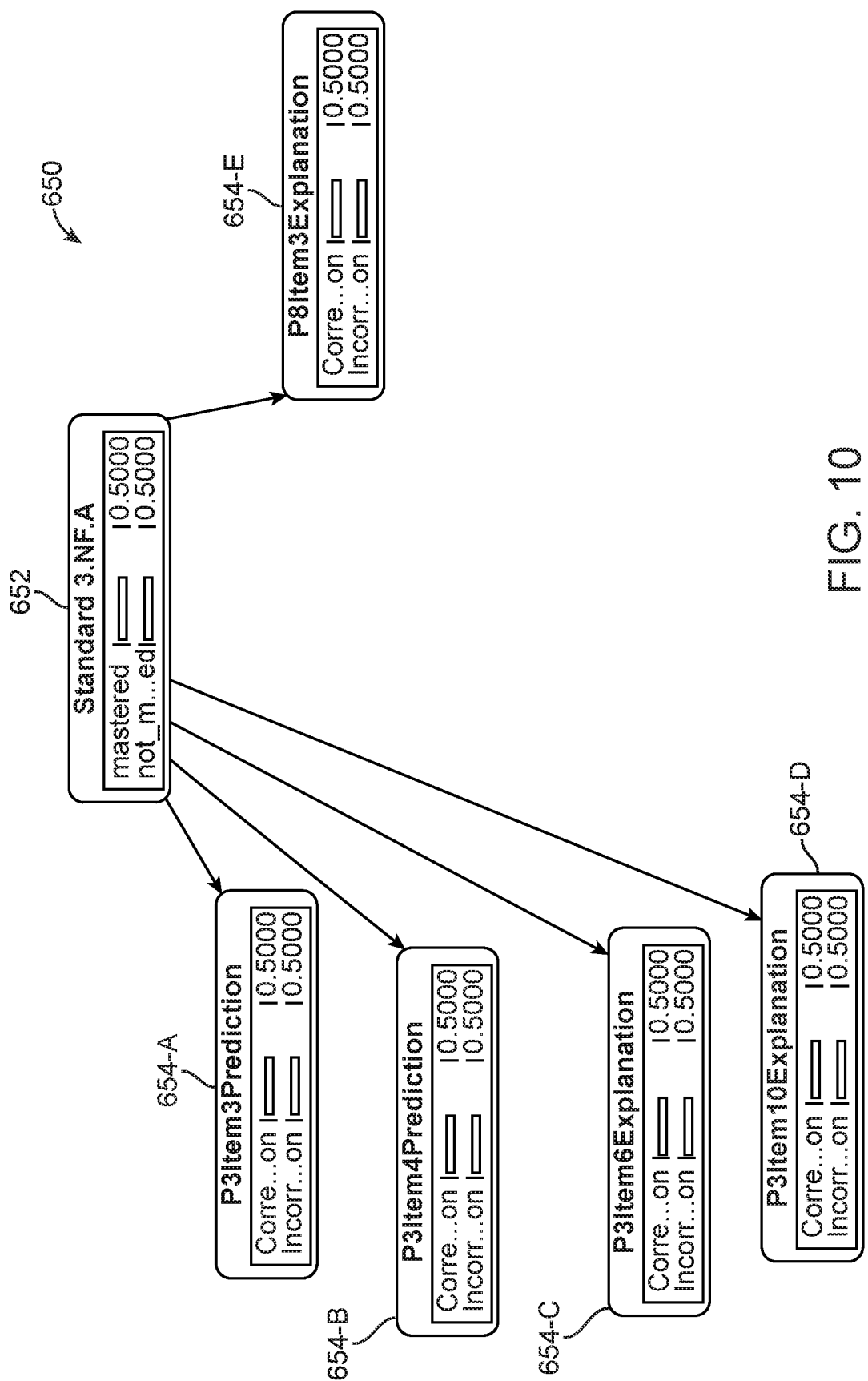
FIG. 10 is a schematic illustration of one embodiment of linked nodes within a network.
Figure 11:
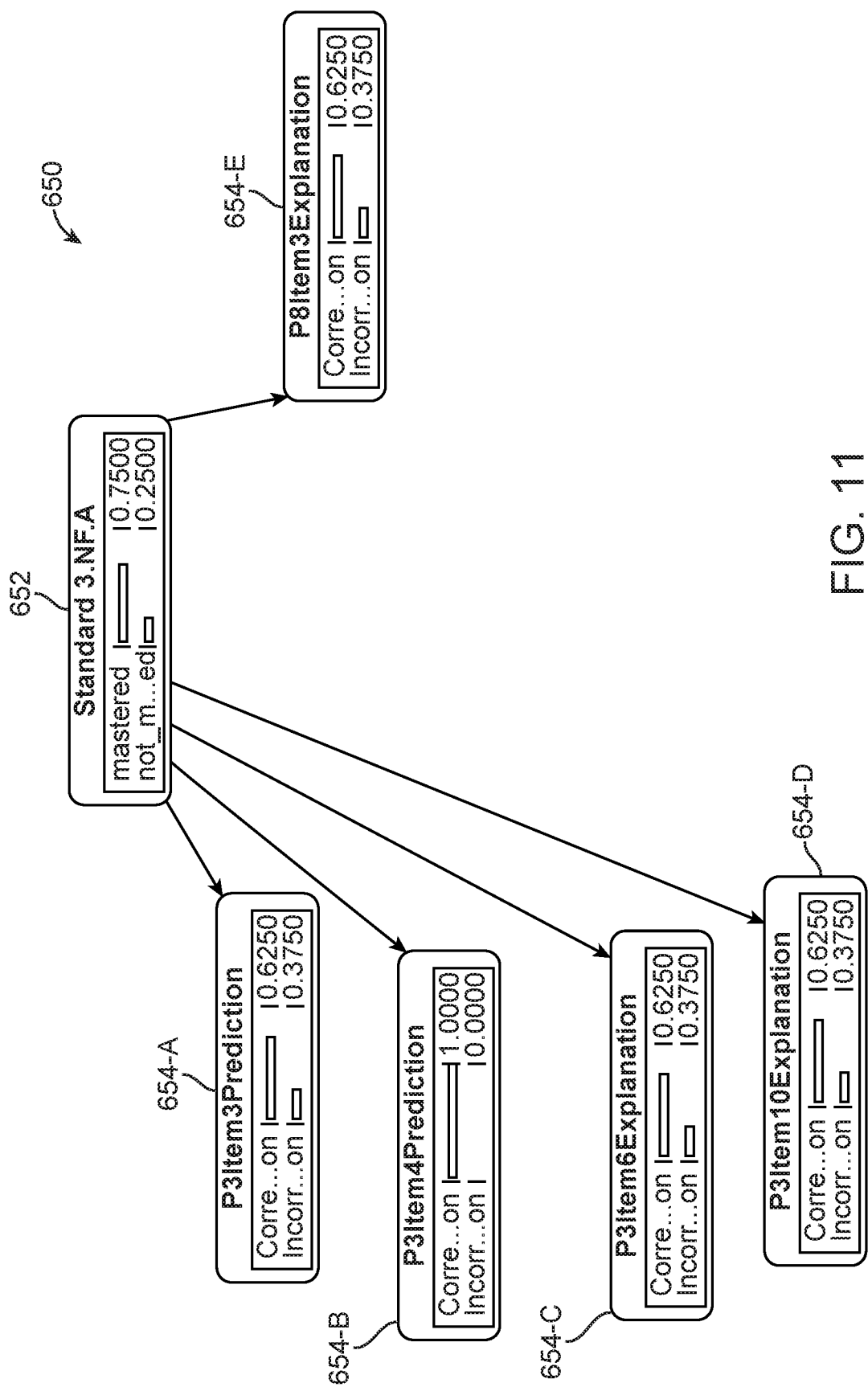
FIG. 11 is a schematic illustration of one embodiment of linked nodes within a network in which a probability associated with one of the linked nodes is updated.
Figure 12:
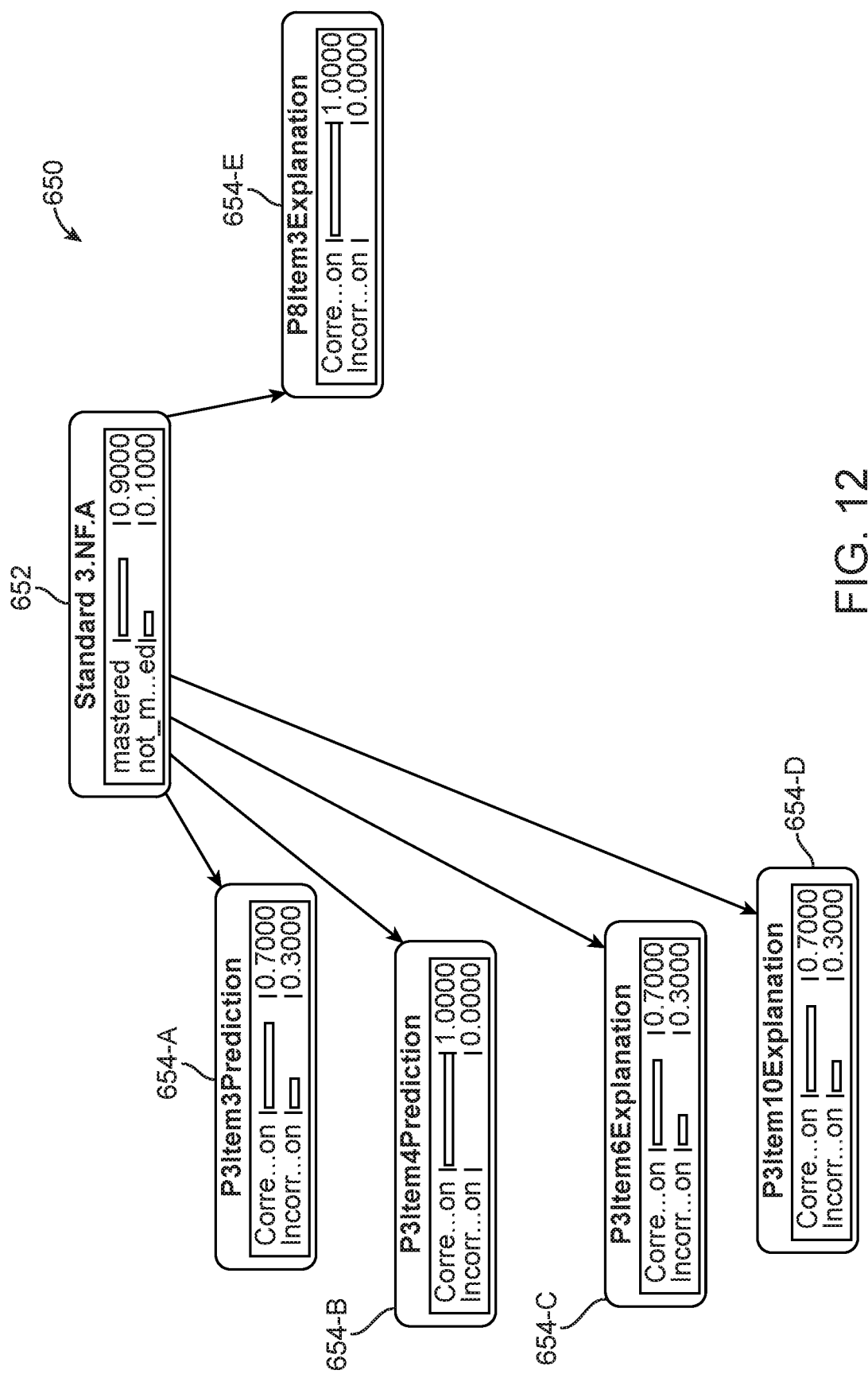
FIG. 12 is a schematic illustration of one embodiment of linked nodes within a network in which probabilities associated with two of the linked nodes are updated, which two of the linked nodes can be associated with different interim assessments.

Embodiments of nodes linked within the Bayesian network 650 are shown in FIGS. 10, 11, and 12. The Bayesian network 650 includes a plurality of nodes 652, 654. These nodes 652, 654 include a parent node 652 and children nodes 654-A through 654-E. in some embodiments, the parent node 652 can identify a standard and/or a portion of a standard. In FIGS. 10, 11, and 12, the parent node 652 represents the standard 3.NF.A or the portion 3.NF.A of a standard. Each of the children nodes 654-A through 654-E represents items from the item bank. As seen in FIGS. 10, 11, and 12, each of the nodes 652, 654 is associated with one or several probabilities indicative of mastery and/or of correctly responding to the provided item. In the case of the children nodes 654-A, 654-B, 654-C, 654-D, 654-E, the probability of correctly responding to a provided item of each of these children nodes 654-A, 654-B, 654-C, 654-D, 654-E can be determined based on whether the response received to the item provided for that one of the children nodes 654-A, 654-B, 654-C, 654-D, 654-E is correct or incorrect. In the case of the parent node 652, mastery can be determined based on the conditional probabilities linking the parent node 652 to each of the children nodes 654-A, 654-B, 654-C, 654-D, 654-E and the one or several probabilities of correctly responding to a provided item of each of the children nodes 654-A, 654-B, 654-C, 654-D, 654-E.

In the embodiment of FIG. 10, no response has been received to any of the items of the children nodes 654-A, 654-B, 654-C, 654-D, 654-E, and thus the probabilities of correctly responding to a provided item of the children nodes 654-A, 654-B, 654-C, 654-D, 654-E are set to a default value and/or to an initial value. In some embodiments, these default values and/or initial values can be unrelated to any information relevant to the recipient-user such as previously gathered user metadata, and in some embodiments, these default values and/or initial values can be related to any information relevant to the recipient-user. In the embodiment of FIG. 10, these default values and/or initial values are unrelated to previously gathered user metadata and are set to a 50% probability of correctly responding to the provided item. Due to the conditional probabilities linking the children nodes 654-A, 654-B, 654-C, 654-D, 654-E and the parent node 652, in the embodiment of FIG. 10, the probability of mastery of the parent node 652 is 50%.

In contrast to this situation in which no response has been received, in FIG. 11 a response has been received to the provided item of child node 654-B, and specifically, a correct response has been received to the provided item of child node 654-B. In further contrast to this situation in which no response has been received, in FIG. 12, a response has been received to the child nodes 654-B and 654-E, and specifically an correct response has been received to both the provided item of child node 654-B and child node 654-E. Accordingly, the probability of correctly responding to the item associated with the child node 654-B is one or 100% in both FIGS. 11 and 12, and the probability of correctly responding to the item associated with the child node 654-E is 1 or 100% in FIG. 12. If, in the alternative, one or both of the provided responses were incorrect responses, the probability of correctly responding to the item associated with the child node associated with that response would be 0.

With respect to FIG. 11, due to the received correct response, the updated probability of the user correctly responding to the item associated with the child node 654-B, and the conditional probabilities linking the children nodes 654-A, 654-B, 654-C, 654-D, 654-E and the parent node 652, the probability of mastery of the parent node 652 has increased from 50% to 75%. Due to the conditional probabilities linking the parent node 652 to the other child nodes 654-A, 654-C, 654-D, 654-E, the probability of the user correctly responding to the items for each of the other child nodes 654-A, 654-C, 654-D, 654-E has increased from 50% to 62.5%. With respect to FIG. 12, due to the received correct responses, the updated probability of the user correctly responding to the items associated with child nodes 654-B, 654-E, and the conditional probabilities linking the children nodes 654-A, 654-B, 654-C, 654-D, 654-E and the parent node 652, the probability of mastery of the parent node 652 has increased, with respect to FIG. 10, from 50% to 90%, and with respect to FIG. 11 from 75% to 90%. Due to the conditional probabilities linking the parent node 652 to the other child nodes 654-A, 654-C, 654-D, the probability of the user correctly responding to the items for each of the other child nodes 654-A, 654-C, 654-D has increased from 50% to 70% with respect to FIG. 10, and has increased from 62.5% to 70% with respect to FIG. 11. Similarly, as responses to items provided for the others of the children nodes 654-A, 654-C, 654-D are received, the probability of mastery of the parent node 652 is updated based on the received responses, and the conditional probabilities linking the children nodes 654-A, 654-B, 654-C, 654-D, 654-E and the parent node 652. This updated probability can increase when correct responses are received, and can decrease when incorrect responses are received.

In some embodiments, these items can all be provided to the recipient-user in a single interaction with the content distribution network 100, and in some embodiments, these items can be provided to the recipient-user in a plurality of interactions with the content distribution network 100. In such an embodiment, for example, the items associated with child nodes 654-A through 654-D may be provided to the recipient-user in a first interaction with the content distribution network 100 and the items associated with child node 654-E may be provided to the recipient-user in a second interaction.

In some embodiments, for example, this first interaction can correspond to a first interim assessment in the second interaction can correspond to a second interim assessment. In some embodiments, the first interim assessment can be provided at a first time, for example, after the completion of a first set of one or several instructional units, and the second interim assessment can be given at a second time, for example, after completion of a second set of one or several instructional units. In some embodiments, the first and second interim assessment can be used to gather evidence of mastery of the parent node 652 without the use of a cumulative assessment also referred to herein as a summative assessment. In some embodiments, the use of interim assessments to determine mastery provides several advantages over the use of cumulative assessments. Namely, interim assessments can be provided closer in time to when the instructional unit associated with the portions of the standard implicated in the interim assessment were provided. This can advantageously allow evaluating of knowledge or skill levels that are fresh in the recipient-user's mind, and can facilitate the providing of remediation in the event that mastery is not achieve. In some embodiments, for example, because the interim assessment is provided close to the instructional unit associated with the portions of the standard implicated in the interim assessment, a presenter can more easily provide remediation or an intervention without disrupting the delivery of content to one or several recipient-users.

A dashboard database 310 can include information for generating a dashboard. In some embodiments, this information can identify one or several dashboard formats and/or architectures. As used herein, a format refers to how data is presented in a web page, and an architecture refers to the data included in the web page and the format of that data. In some embodiments, the dashboard database 310 can comprise one or several pointers to other databases for retrieval of information for inclusion in the dashboard. Thus, in one embodiment, the dashboard database 310 can comprise a pointer to all or portions of the user profile database 301 to direct extraction of data from the user profile database 301 for inclusion in the dashboard.

A survey database 311 may include information relating to one or several surveys. In some embodiments, this can include information relating to the providing of one or several surveys and/or information gathered in response to one or several surveys. The information relating to providing one or several surveys can include, for example, information comprising one or several surveys and/or one or several questions, information identifying one or several survey recipients including, for example, one or several individual recipients or one or several groups of recipients such as, for example, one or several classes or portions of one or several classes, one or several frequencies for providing surveys, or the like. In some embodiments, the survey database 311 can include information identifying when to provide a survey, which information can include, for example, one or several triggers and one or several associated thresholds, also referred to herein as trigger thresholds. In one embodiment, these triggers comprise a plurality of triggers delineating between circumstances in which a survey is indicated for providing and circumstances in which a survey is not indicated for providing. In some embodiments, a survey should be provided to one or several user devices when a survey is indicated for providing, and a survey should not be provided to one or several user devices when a survey is not indicated for providing. In some embodiments, these one or several triggers can each be linked to one or several questions or surveys such that one or several questions or surveys can be selected for providing to users based on tripped triggers.

In some embodiments, these triggers can include, for example, a change in attendance and/or participation, including a decrease in attendance and/or participation, an increase in attendance and/or participation, attendance and/or participation above or below a threshold level, or the like, a change in student comprehension as indicated by a change in grades, performance, or the like, a change in positive and/or negative references to a class and/or presenter in social media, or the like.

In some embodiments, the information gathered in response to the one or several surveys can include, for example, user provided answers to one or several surveys, one or several survey questions, or the like. In some embodiments, this information can be linked to the user source of the information, and in some embodiments, this information can be separated from the user source of the information.

The survey information database 311 can comprise a single database or a plurality of databases such as, for example, a question database and/or a trigger database. In some embodiments, the question database can include a plurality of questions that can be organized according to one or several parameters. These parameters can include, one or several associated triggers, one or several levels of specificity, and/or one or several questioned subject matter. Thus, in some embodiments, some or all of the questions in the question database can be associated with a value linking the each of the some or all of the questions with one or several triggers stored in the trigger database. Further, each of the questions can include a value associating the question with a questioned subject matter, which question subject matter can be, for example, an area of the course about which the question is intended to gather information via student response. These areas of the course can include, for example, the presenter's teaching style (i.e. how the teacher is teaching), the appropriateness/successfulness of the course assignments, the quality and/or value of the course content, and/or the teacher's approach and/or interaction with one or several individuals. The question database can further include one or several values identifying the specificity of each question in the question database. This value identifying specificity can result in the creation of a tree-like structure of questions, with some trunk-questions identified as being directed to broad areas, and other branch-questions identified as being directed to one or several portions of the broad areas identified by one or several of the trunk-questions. This tree-like structure can contain multiple levels of child-questions directed to a portion of the subject area of their parent questions, and these multiple levels can be repeated until a desire level of specificity is attained.

In some embodiments, the entirety of the data contained in the survey information database 311 can be stored in a single memory such as, for example, within a single memory tier, and in some embodiments, the data contained in the survey information database 311 can be stored in multiple memories such as, for example, within multiple tiers of memory. In some embodiments, dividing the data contained in the survey information database 311 into multiple tiers of memory can allow efficient use of storage resources by placing items that are desired to be quickly accessible in lower tiers than information that is not desired to be as quickly accessible.

The survey database 311 can include information identifying the individual's performance in evaluating the presenter, the course, and/or the course material, as well as identifying the individual's performance in academic portions of the class. In some embodiments, the survey database 311 includes information identifying the individual's performance evaluating the presenter, course, and/or the course material and does not include information relating to the individual's academic performance. This data may indicate the amount of time spent by the individual in completing past surveys, indicate the number of written comments, or the like.

The survey database 311 can include one or several evaluations and/or evaluation reports. In some embodiments, the evaluations and/or evaluation reports can be an aggregate of data relating to presenter performance, material performance, and/or course performance.

In some embodiments, the survey database 311 can include information relating to provided feedback relating to a presenter, a course, and/or learning materials. In some embodiments, this feedback can include one or several recommendations, including, for example, one or several recommended additional and/or replacement materials, one or several material changes, one or several recommended presenter improvement resources such as, for example, papers, books, courses, training, seminars, or the like, which improvement resources can relate to management, organization, speaking, educational and/or instructional techniques, or the like.

In some embodiments, the survey database 311 can be divided into a first portion comprising first memory components and a second portion comprising second memory components. In some embodiments, the first portion can comprise relatively faster memory components and the second portion can comprise relatively slower memory components. Thus, in one embodiment, the first portion can comprise tier 0 or tier 1 memory components and the second portion can comprise tier 1 or tier 2 memory components. In some embodiments, data from the survey database 311 can be divided between the first and second portions based on whether the data is used for real-time analysis. Thus, data used for real-time analysis can be stored in the first portion and data that is not used for real-time analysis can be stored in the second portion. In one such embodiment a set of the triggers from the trigger database that can be used to indicate a time-sensitive desire for providing a survey can be stored within the first portion of the survey database 311, and a set of the triggers from the trigger database that can be used to indicate a non-time-sensitive desire for providing a survey can be stored within the second portion of the survey database 311.

In addition to the illustrative databases described above, database server(s) 104 may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party databases containing demographic data, education related data, consumer sales data, health related data, and the like. Illustrative external data aggregators 312 may include, for example, social networking web servers, public records databases, learning management systems, educational institution servers, business servers, consumer sales databases, medical record databases, etc. Data retrieved from various external data aggregators 312 may be used to verify and update user account information, suggest user content, and perform user and content evaluations.

Figure 4:
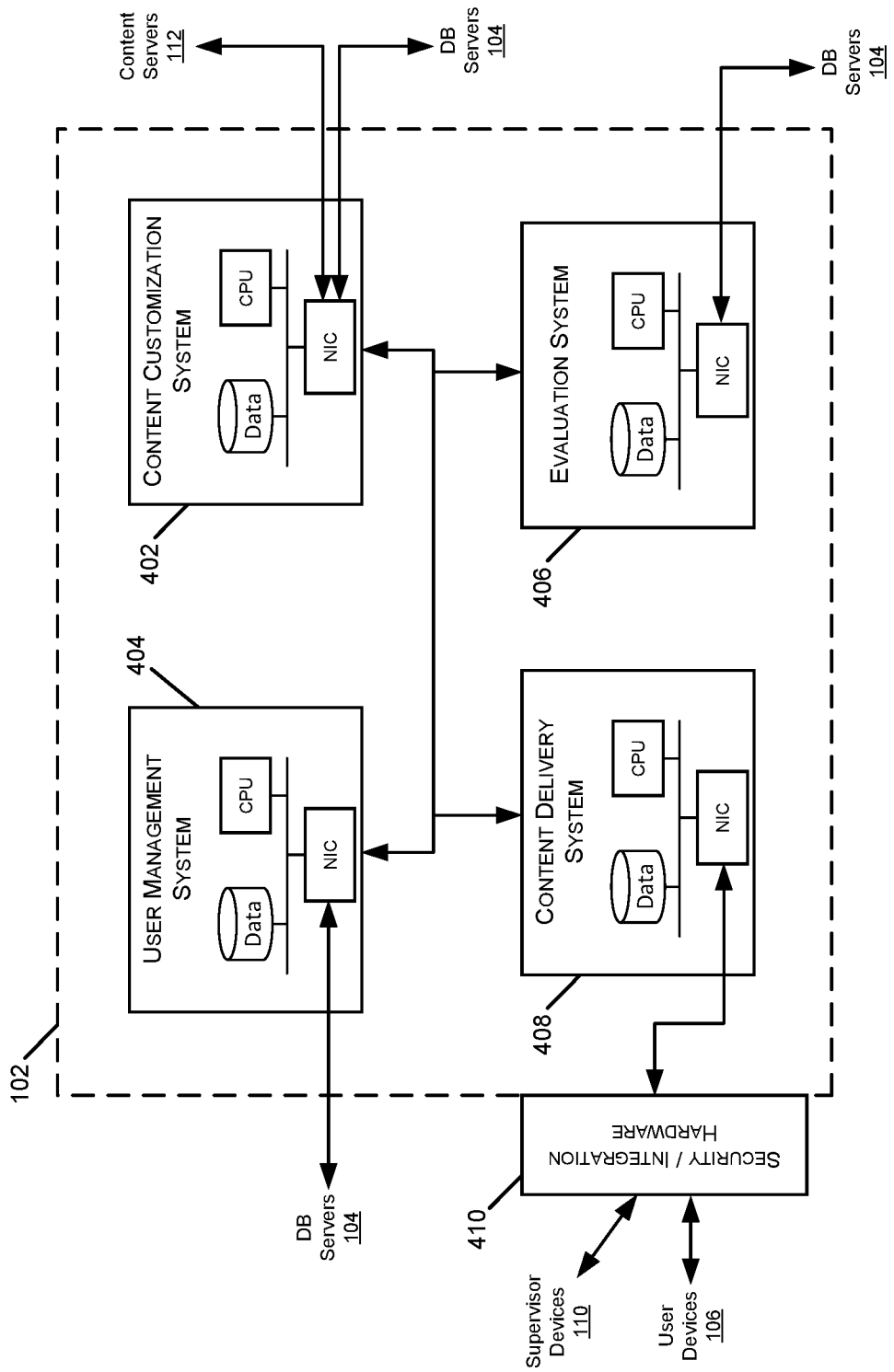
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation database 308), and the like. Based on the retrieved information from databases 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a recipient-user based on one or several received responses from that recipient-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, presenter effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
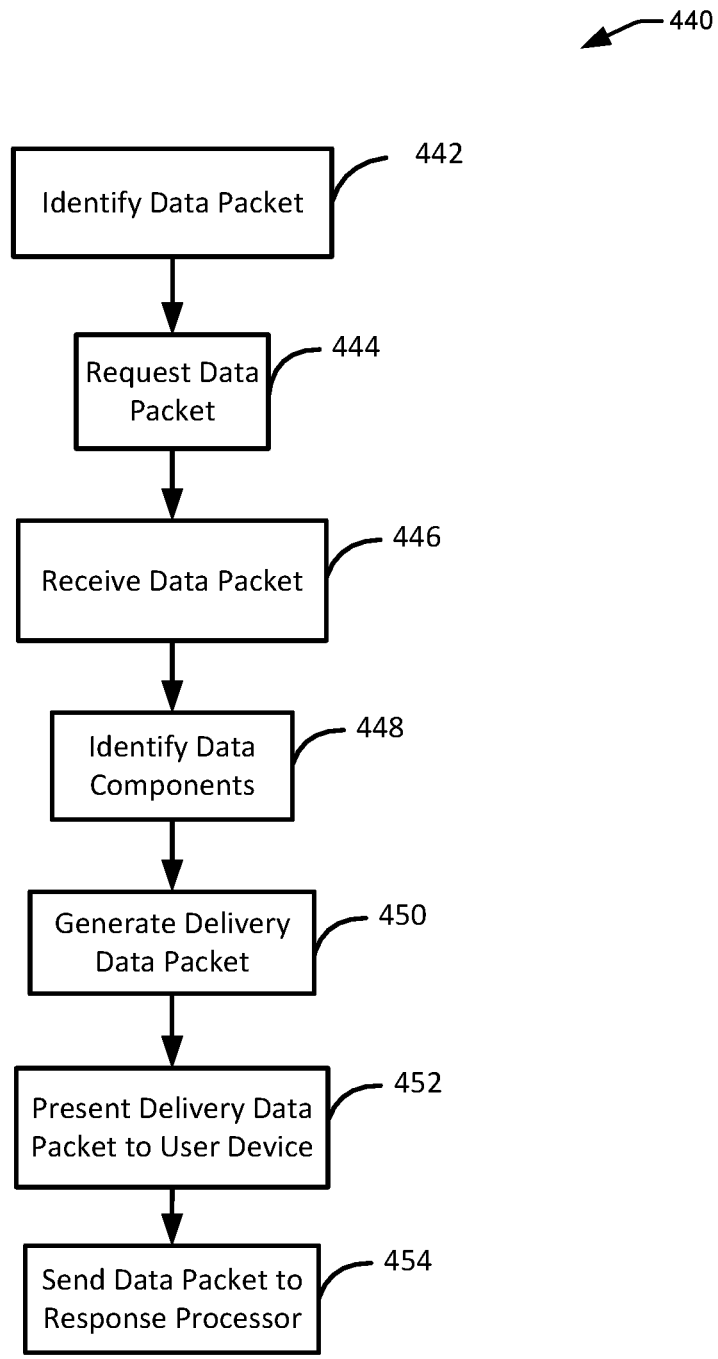
FIG. 5 is a flowchart illustrating one embodiment of a process for data management.

With reference now to FIG. 5, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a recipient-user, and the data packet can be identified by determining which data packet to next provide to the user such as the recipient-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the recipient-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the recipient-user, and sending the response to the recipient-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 6:
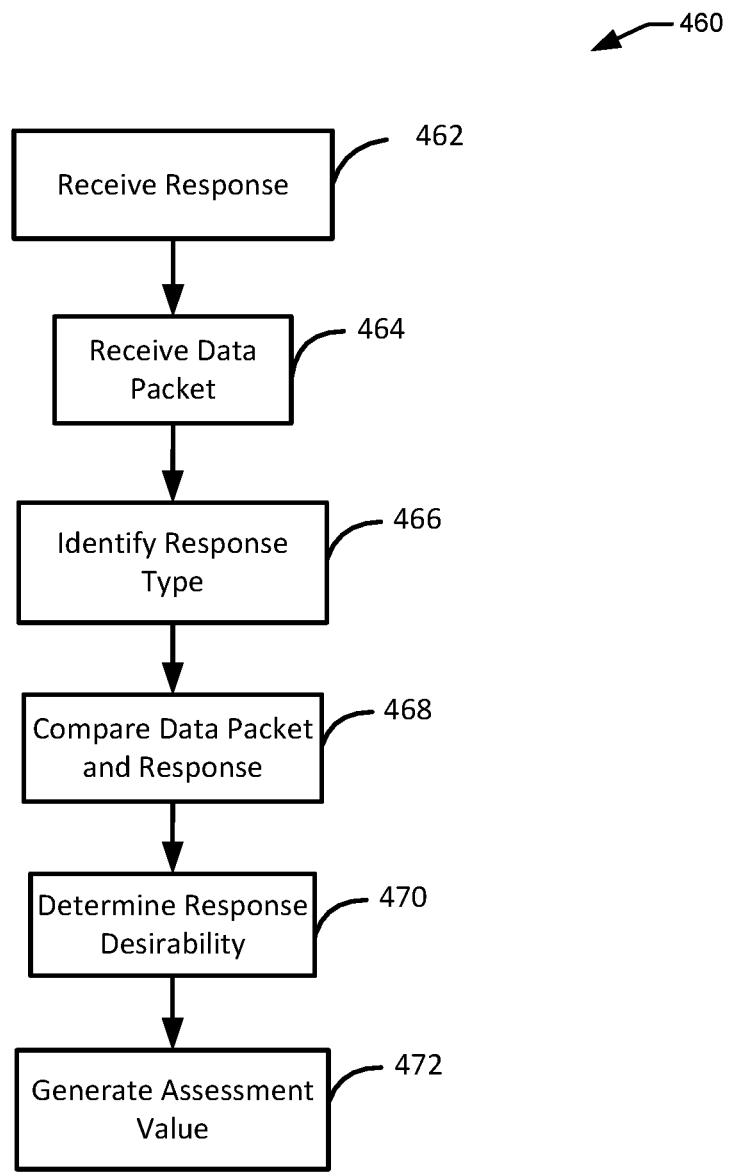
FIG. 6 is a flowchart illustrating one embodiment of a process for evaluating a response.

With reference now to FIG. 6, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 7:
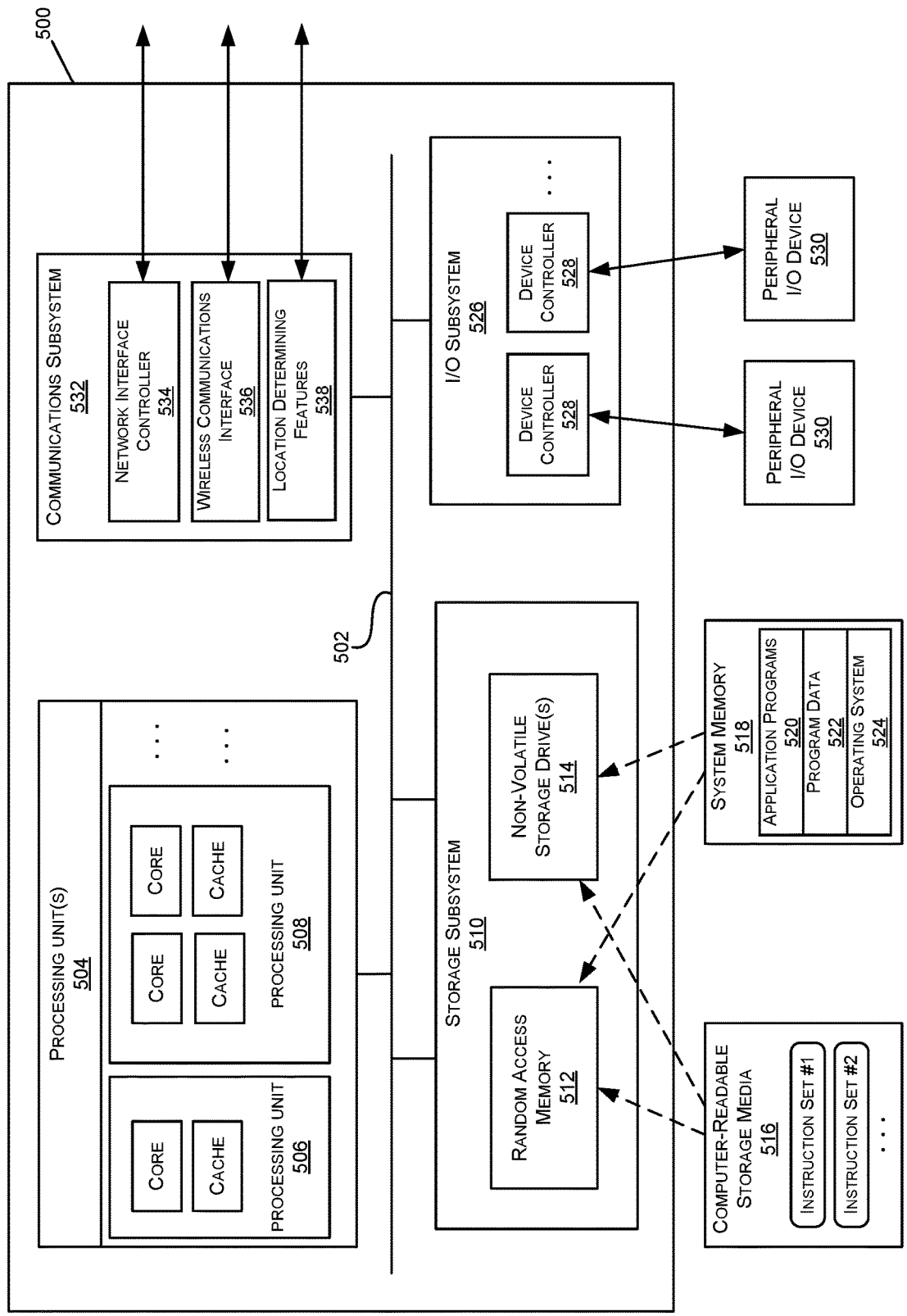
FIG. 7 is a block diagram illustrating the physical and logical components of a special-purpose computer device within a content distribution network.

With reference now to FIG. 7, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 7, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 7, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem

532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 8:
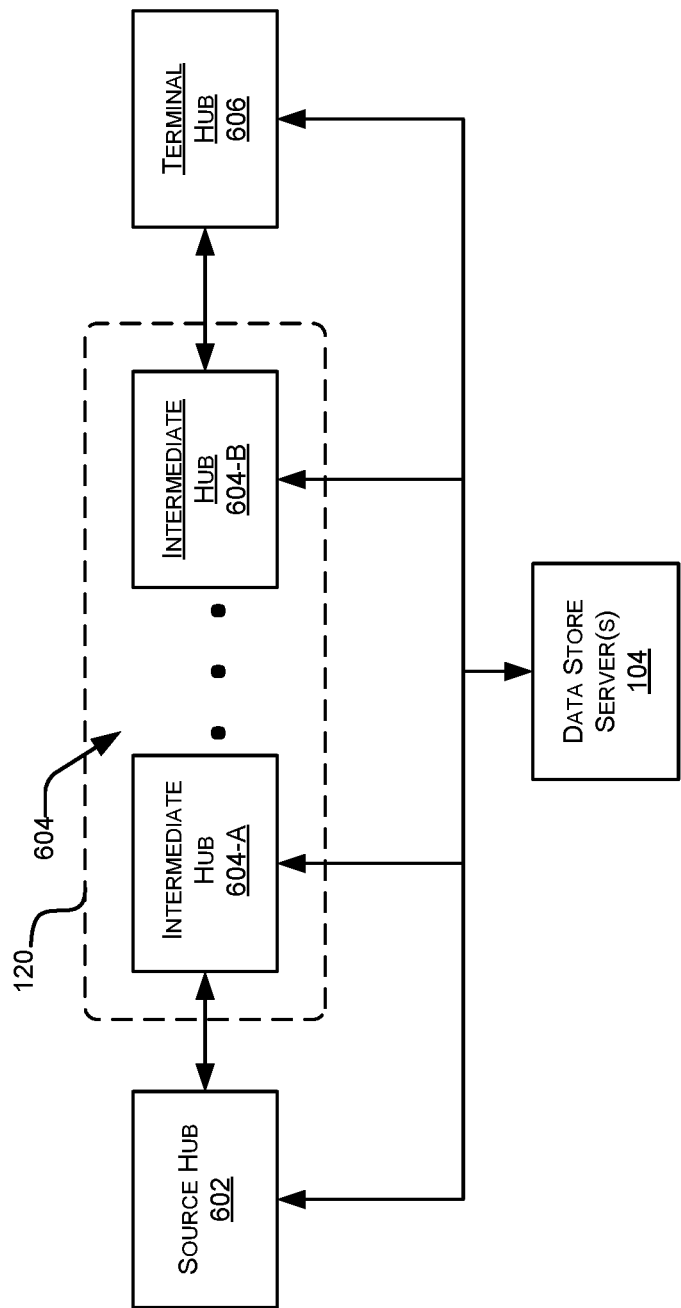
FIG. 8 is a block diagram illustrating one embodiment of the communication network.

With reference now to FIG. 8, a block diagram illustrating one embodiment of the communication network is shown. Specifically, FIG. 8 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 8, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 68, the communication network 120 includes a first intermediate hub 604-A and a second intermediate hub 604-B.

Figure 9:
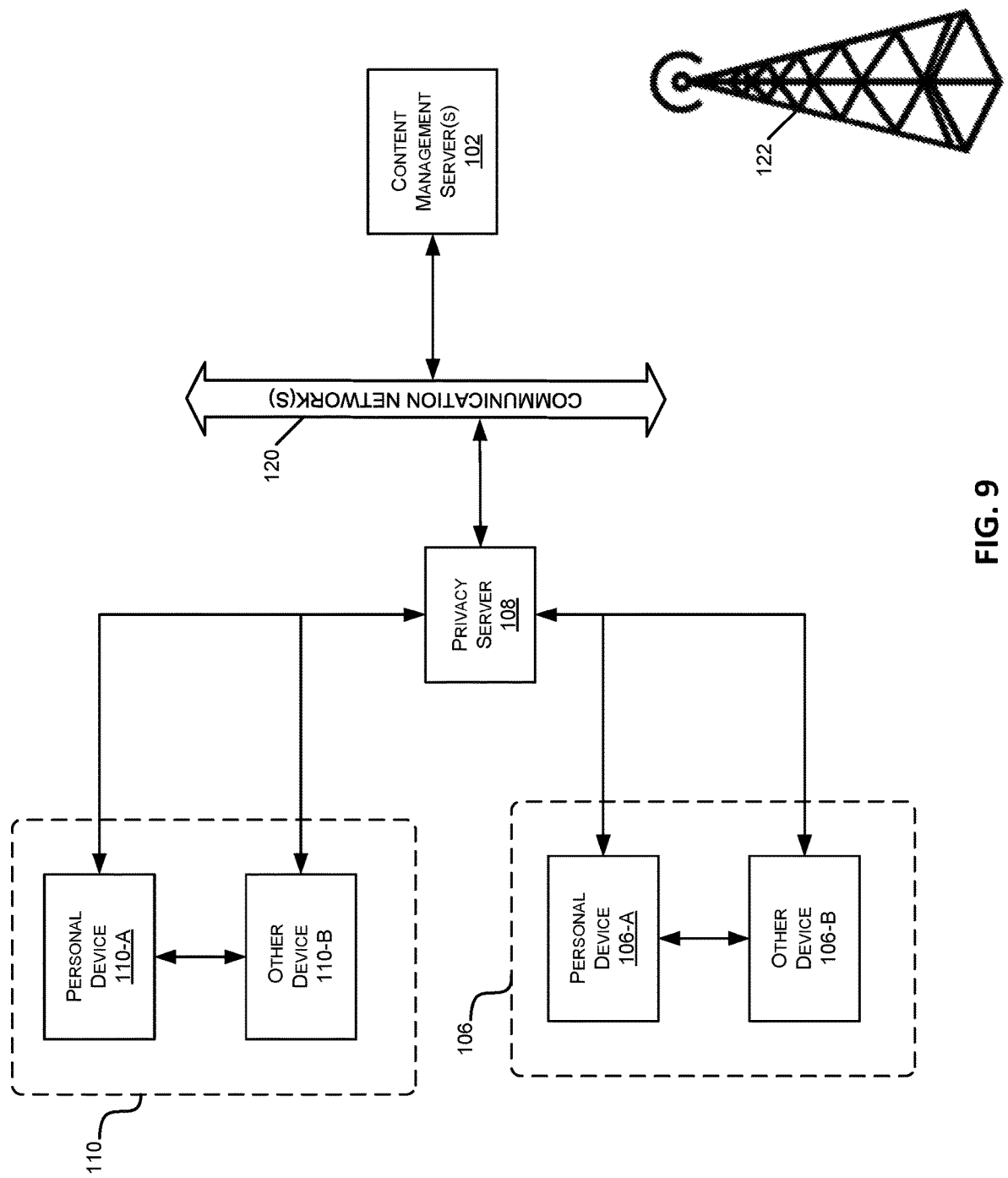
FIG. 9 is a block diagram illustrating one embodiment of user device and supervisor device communication.

With reference now to FIG. 9, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 9, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or recipient-user accounts associated with the recipient-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the recipient device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 13:
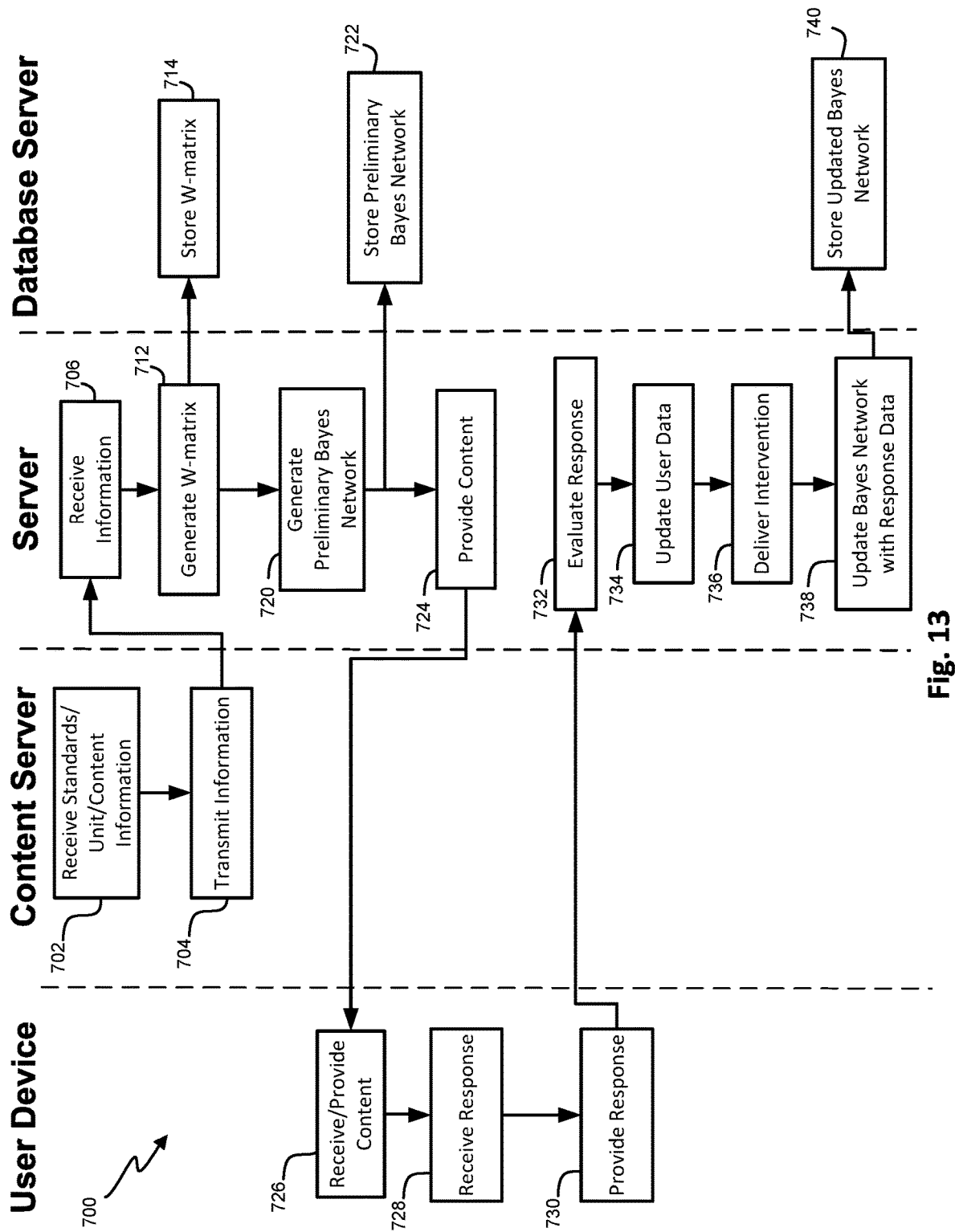
FIG. 13 is a swim lane diagram illustrating one embodiment of a process for generation and automatic updating of network.

With reference now to FIG. 13, a swim lane diagram of one embodiment of a process 700 for generating a Bayes network is shown. The process 700 begins at block 702, wherein content is received at the content server 112. In some embodiments, this information can include one or several standards, information relating to one or several instructional units and/or one or several instructional units, one or several items, or the like. In some embodiments, this content can be received by the content server from one or several author device. In some embodiments, this content can be generated by, on, and/or with the one or several author devices.

After the content has been received, the process 700 proceeds to block 704, wherein the received content and/or the information received in block 702 is transmitted. In some embodiments, this content can be transmitted to the server 102 via a communicative link between the content server 112 and the server 102. In some embodiments, the information received in block 702 can be transmitted to the server 102 via the generation and sending of one or several electronic signals. After the information has been transmitted, the process 700 proceeds to block 706, wherein the information transmitted at block 704 is received by the server 102 as indicated in block 706. In some embodiments, for example, the content server 112 and the server 102 can be communicatively lined via the communication network 120.

After the information has been received, the process 700 proceeds to block 712, wherein the Q-matrix is generated. In some embodiments, the Q-matrix can be generated with the information and/or content received in block 706. The Q-matrix can, as discussed above, link one or several standards and/or components of one or several standards to instructional units and/or items in the item bank. The Q-matrix can, upon generation, be transmitted to the database server 104.

After the Q-matrix has been generated and/or transmitted to the database server 104, the process 700 proceeds to block 714 wherein the Q-matrix is stored. In some embodiments, the Q-matrix can be stored in one of the databases of the database server 104 such as, for example, the content library database 303. Returning again to block 712, after the Q-matrix has been generated, the process 700 proceeds to block 720 wherein a preliminary Bayes network is generated. In some embodiments, the preliminary Bayes network can be generated from the Q-matrix and/or based on the Q-matrix. In some embodiments, this can include retrieving: previously collected response data from recipient-users to items identified in the Q-matrix; the results of previous recipient-user interaction with instructional units; and/or previous recipient-user attainment and/or mastery of one or several standards for standard portions identified in the Q-matrix. In some embodiments, this data can be used to generate conditional probabilities blinking nodes identified is linked by the Q-matrix.

After the preliminary Bayes network has been generated, the process can proceed to block 724 wherein content can be provided to the user device 106. In some embodiments, for example, an interim assessment can be provided to the recipient-user which interim assessment can include one or several items. In some embodiments, these items can be selected for the recipient-user based on instructional units relevant to the recipient-user, one or several skill levels of the recipient-user, or the like. In some embodiments, the content can be provided to the user device 106 via the communication network 120. After the content has been provided, the process 700 proceeds block 726 when the provided content is received by the user device 106 and is provided to the recipient-user via the user device 106. In some embodiments, this content can be provided to the recipient-user via the I/O subsystem 526 and any thereby generated user interface of the user device 106.

After the content has been received and/or provided by the user device 106, the process 700 proceeds to block 728 wherein a response is received by the user device 106. In some embodiments, for example, this response can be received from the user via the I/O subsystem 526 and specifically via a user interface generated by the I/O subsystem 526. After the response has been received by the user device 106, the process 700 proceeds block 730 wherein the response is provided from the user device 106 to the server 102. In some embodiments this can include the generation of the communication, and specifically of an electronic communication, comprising data indicative of the received response. This response can be communicated from the user device 106 to the server 102 via the communication network 120.

After the response has been provided, the process 700 proceeds block 732 wherein the response received by the server 102 is evaluated. In some embodiments, the received response can be evaluated to determine whether the response is a correct response or an incorrect response. In some embodiments, this evaluation can be performed according to data stored in the database server 104 and specifically in one of the databases of the database server 104 such as, for example, the content library database 303 and/or the evaluation database 308. In some embodiments, for example, the server 102 can evaluate the received response with the evaluation system 406 according to information retrieved from the database server 104 to determine whether the received response is a correct response or an incorrect response.

After the response has been evaluated, the process 700 proceeds to block 734 wherein user data for the user associated with the received response is updated. In some embodiments, this can include storing an indicator of a correct response or an incorrect response in the user data for the user associated with the received response based on the result of the evaluation of the received response. In some embodiments, the update of user data can include a calculation of the user skill level, a determination of a user probability of attainment and/or mastery of a portion of a standard and/or of a standard, or the like in some embodiments, this user skill level and/or the probability of attainment and/or mastery of a portion of a standard and/or of the standard can be used to determine whether the user could benefit from an intervention and/or remediation. In some embodiments, for example, the probability of the user attaining and/or mastering a portion of the standard and/or the standard, or the user skill level can be compared to one or several thresholds that can delineate between skill levels or probabilities indicative of desired intervention and/or remediation, and skill levels and/or probabilities non-indicative of desired intervention and/or remediation.

After the user data has been updated, the process 700 proceeds to block 736 wherein any desired intervention and/or remediation is delivered and/or provided. In some embodiments, they can be determined whether to provide an intervention and/or remediation based on the comparison of the user skill level and/or probabilities discussed with respect to block 734 and one or several thresholds that can be, for example, retrieving the database server 104. If it is determined that an intervention is desired, then intervention content and/or remediation content can be selected. In some embodiments, this content can be relevant to the incorrect response. In some embodiments, the intervention and/or remediation can be provided to the user device 106 from the server 102, and can then be provided to the user via the I/0 subsystem 526 of the user device 106. In some embodiments, and as part of the intervention, one or several responses can be received, which can be evaluated according to step 732.

At block 738 of the process 700, the Bayes network is updated based on the evaluation of the received response. In some embodiments, for example, this can include the strengthening and/or diminishing of one or several conditional probabilities linking nodes within the Bayesian network. After the Bayesian network has been updated, the process 700 proceeds to block 740 wherein the updated Bayesian network is stored in, for example, the database server 104, and specifically within the model database 309 of the database server 104.

Figure 14:
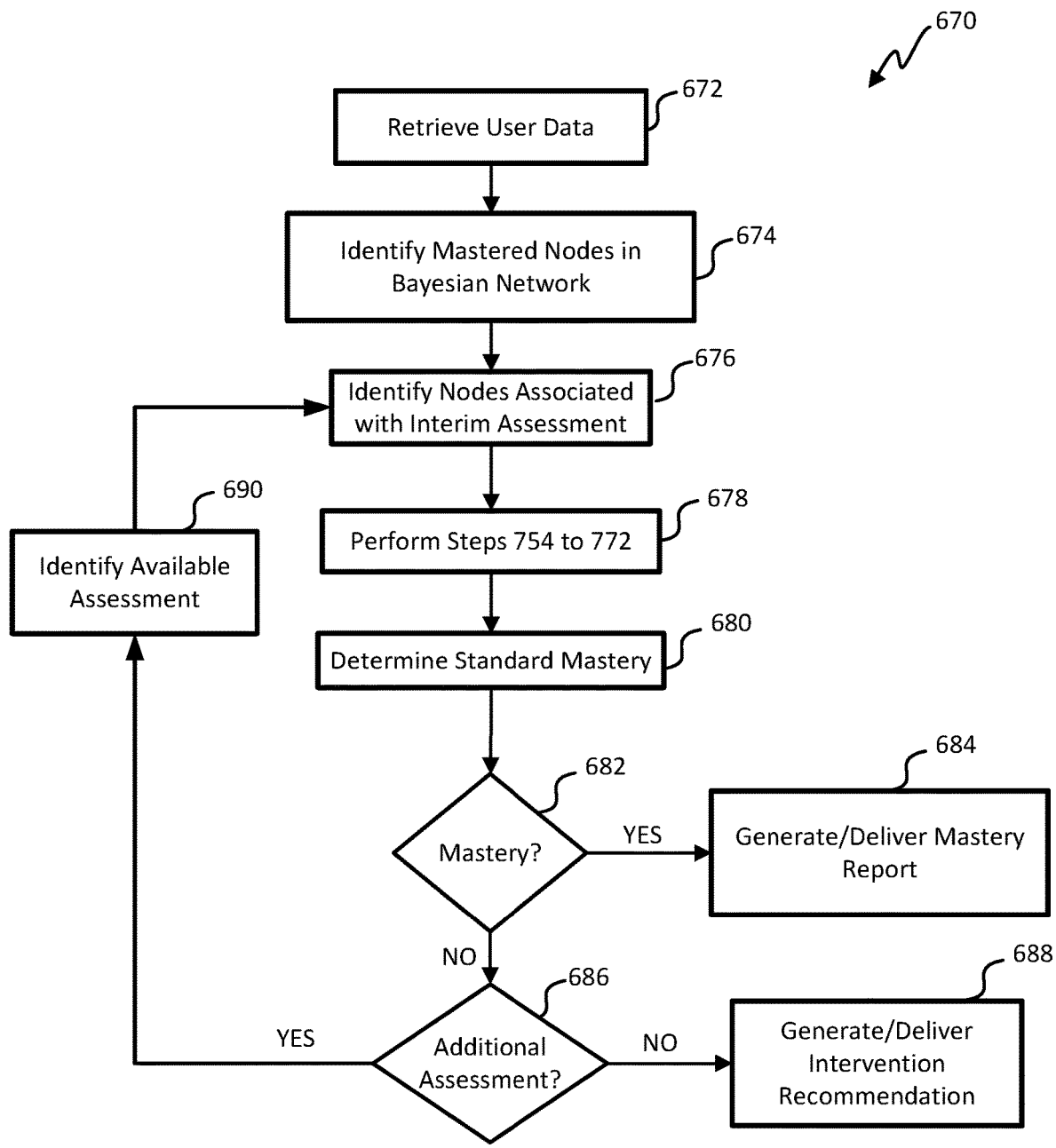
FIG. 14 is a flowchart illustrating one embodiment of a process for determining attainment of a standard via administration of one or several interim assessments.

With reference now to FIG. 14, a flowchart illustrating one embodiment of a process 670 for determining attainment of a standard via administration of one or several interim assessments is shown. The process 670 can be performed by all or portions of the content distribution network 100. The process 670 begins at block 672, wherein user data is received and/or retrieved. This user data can identify, for example, content already provided to the user, nodes already mastered and/or unmastered by the user, the user's mastery probabilities of one or several nodes, or the like. The user data can be received and/or retrieved from the user profile database 301 of the database server 104.

After the user data is received and/or retrieve, the process 670 proceeds to block 674, wherein mastered nodes within the Bayesian network and/or mastery levels for nodes within the Bayesian network are identified. In some embodiments, this can be performed by the server 102 based on the user data received an/or retrieved in block 672. After identification of mastered nodes and/or mastery levels of nodes, the process 670 proceeds to block 676 wherein nodes associated with an interim assessment identified. In some embodiments, this information can be an interim assessment that has not been provided to the user. In some embodiments, the interim assessment can be identified based on the retrieved user data, and specifically on information contained in the user data, identifying one or several interim assessments already completed by the user and/or one or several outstanding interim assessments. Once the interim assessment is identified, one or several nodes associated with that interim assessment can be identified. In some embodiments, for example, once an interim assessment is that identified, information associated with that interim assessment can be retrieved from the database server 104 and specifically from the content library database 303. This information associated with enormous assessment can identify, for example, content, such as one or several questions for providing as part of the interim assessment.

Figure 15:
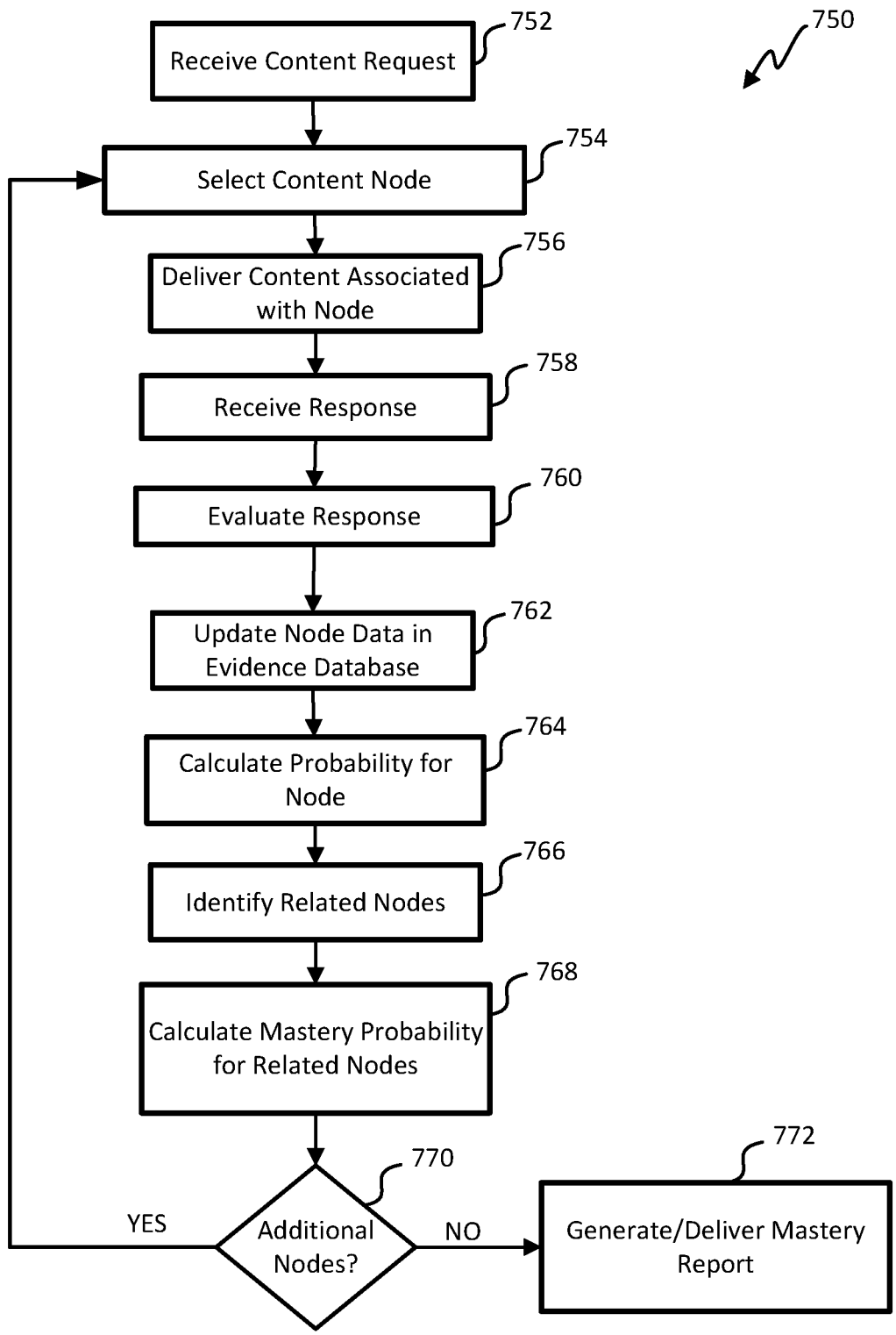
FIG. 15 is a flowchart illustrating one embodiment of a process for automatic generation of a mastery report.

After nodes associated with enormous assessment have been identified, the process 670 proceeds to block 678, wherein the steps of block 754 through 772 of FIG. 15, a performed. After Six or 78, the process 670 proceeds to block 680 wherein mastery of the standard is determined. In some embodiments, this mastery of the standard is determined by determining the mastery probability of one or several portions of the standard, which one or several portions of the standard are associated with one or several nodes of the Bayesian network. Edges connecting these nodes within a representative of the entire standard, and the conditional probabilities associated with those edges can be retrieved from the database server 104 and specifically from the model database 309. Based on these mastery probabilities, and the conditional probabilities, a standard mastery probability for the node associated with the entire standard can be determined, and this standard mastery probability can be compared to a threshold delineating between mastery of this entire standard and non-mastery of the entire standard. If it is determined, at decision state 682, the standard is mastered, then the process 670 proceeds to block 684, wherein a mastery report is generated an/or delivered. This mastery report can include the generation of mastery data indicative of the level of mastery of the student user which mastery data can be stored in the database server 104 and specifically in the user profile database 301. In some embodiments, this mastery report which graphically depict standards or portions of standards that the user has mastered, has not mastered, and/or for which insufficient data has been gathered to determine mastery.

Returning again to decision state 682, if it is determined that mastery has not been achieved, then the process 670 proceeds to decision state 686 where it is determined if there are any additional assessments, which can include, for example, one or several previously unprovided interim assessments. In some embodiments, this can include determining the presence and/or existence of an additional assessment in the database server 104, and specifically in the content library database 303. This determination can be made by the server 102 based on the user data retrieved from the user profile database 301, which user data can identify interim assessments previously provided to the user. If it is determined that there are no additional assessments, than the process 670 proceeds to block 688, wherein an intervention recommendation is generated an/or delivered. In some embodiments, this can include the generation and/or delivery of a mastery report indicating the non-mastery of the standard and/or portions of the standards. This can further include information indicating all or portions of the standard that remain on mastered and/or can provide content such as remedial content, or an intervention which can assist in facilitating future mastery of the currently on mastered all or portions of the standard. The intervention recommendation can be delivered to the user device 106, an/or to the supervisor device in the form of an alert, which can come in some embodiments, including the features and/or capabilities of the above-discussed alerts.

Returning again to decision state 686, if it is determined that there are additional assessments, than the process 670 proceeds to block 690, wherein one or several available assessments are identified, and one of the one or several available assessments is selected. In some embodiments, these one or several available assessments can be identified based on the user data received an/or retrieved in block 672, and one of the one or several assessments can be identified based on information, the user data, identifying mastery and/or lack mastery of one or several nodes in the Bayesian network. After one of the one or several available assessments has been identified, the process 670 returns to block 676 and proceeds as outlined above.

With reference now to FIG. 15, a flowchart illustrating one embodiment of a process 750 for generating and/or delivering a mastery report is shown. The process 750 can be performed by all or portions of the content distribution network 100. The process 750 begins a block 752 wherein a content request is received. In some embodiments, this content request can be a request for delivery of one or several items of an interim assessment to a recipient-user. The content request can be received by the server 102 from the user device 106 and can include information identifying the recipient-user requesting the content and/or one or several attributes or identifiers of the requested content.

After the content request is then received, the process 750 proceeds to block 754 wherein a content nose relevant to the received content request is selected. In some embodiments, this can include identifying the node of the Bayesian network corresponding to the content request. In some embodiments, the selection of the content node can include the identification and selection of an item for providing to the user. In some embodiments, after the content node has been selected, the process 750 proceeds to block 756 wherein content associated with the selected node is delivered and/or provided to the student. In some embodiments, this can include providing the item associated with the node to the user device 106 from the server 102 via the communication network 120, and then providing the item to the recipient-user via the I/O subsystem 526 and any user interface generated by the I/O subsystem 526.

After the content associated with the node has been delivered, the process 750 proceeds block 758 wherein a response is received. In some embodiments, the response received from the user can be associated with the node for the item that was delivered. The response can be received from the user at the user device 106 via the I/O subsystem 526, and specifically via any user interface generated via the I/O subsystem 526. After the response has been received, the process 750 proceeds to block 760 wherein the response is evaluated. In some embodiments, the response can be evaluated by the server 102 and specifically by the evaluation system 406 of the server 102 according to data retrieved from the database server 104 and specifically from one or several of the databases of the database server 104 such as, for example, the content library database 303 and/or the evaluation database 308.

After the responses have been evaluated, the process 750 proceeds to block 762 wherein node data or data associated with an item is updated in the evidence database. In some embodiments, for example, this can include adding an entry into the evidence database for the item for which the response was received, which entry can contain data indicative of the received response, the evaluation of the received response, and/or the student that provided the received response. After the evidence database has been updated, the process 750 proceeds to block 764 wherein a probability for the node associated with the item is calculated and/or determined. In some embodiments, and as discussed herein, the probability associated with a node foreign item can be the probability of the user correctly responding to the item. This probability can be updated to reflect the evaluation of the received response. In such an embodiment, for example, the probability can be updated to 100% when the received response is a correct response and the probability can be updated to 0% when the received response is an incorrect response. This probability can be updated by the server 102, and this probability can be stored in the database server 104.

After the probability for the node has been determined or calculated, the process 750 proceeds to block 766 wherein related nodes, and specifically wherein related parent nodes are identified. In some embodiments, this can include identifying parent nodes linked to the node associated with the item via an edge in the Bayesian network. In some embodiments, this can include retrieving the Q-matrix to identify the standards or portions of a standard linked to the item or node.

After the parent nodes have been identified, the process 750 proceeds block 768 wherein a probability of mastery for the parent node(s) is calculated. In some embodiments, this is calculated by the Bayesian network based on the conditional probabilities linking the node of block 764 with the parent node. After the mastery probability has been calculated, the process 750 proceeds to block 770 wherein it is determined if there are additional nodes or additional items to be provided in the interim assessment. In some embodiments, this can include determining if the interim assessment is done, or if additional items should be provided. If it is determined that there are additional items to be provided, than the process 750 returns to block 754 and proceeds as outlined above. If it is determined that there are no additional nodes to be provided, then the process 750 proceeds to block 772 wherein a mastery report is generated and delivered. In some embodiments, this can include the generation of mastery data indicative of the level of mastery of the student user which mastery data can be stored in the database server 104 and specifically in the user profile database 301. In some embodiments, this data can be used to generate a mastery report which can graphically depict standards or portions of standards that the user has mastered, has not mastered, and/or for which insufficient data has been gathered to determine mastery.

Figure 16:
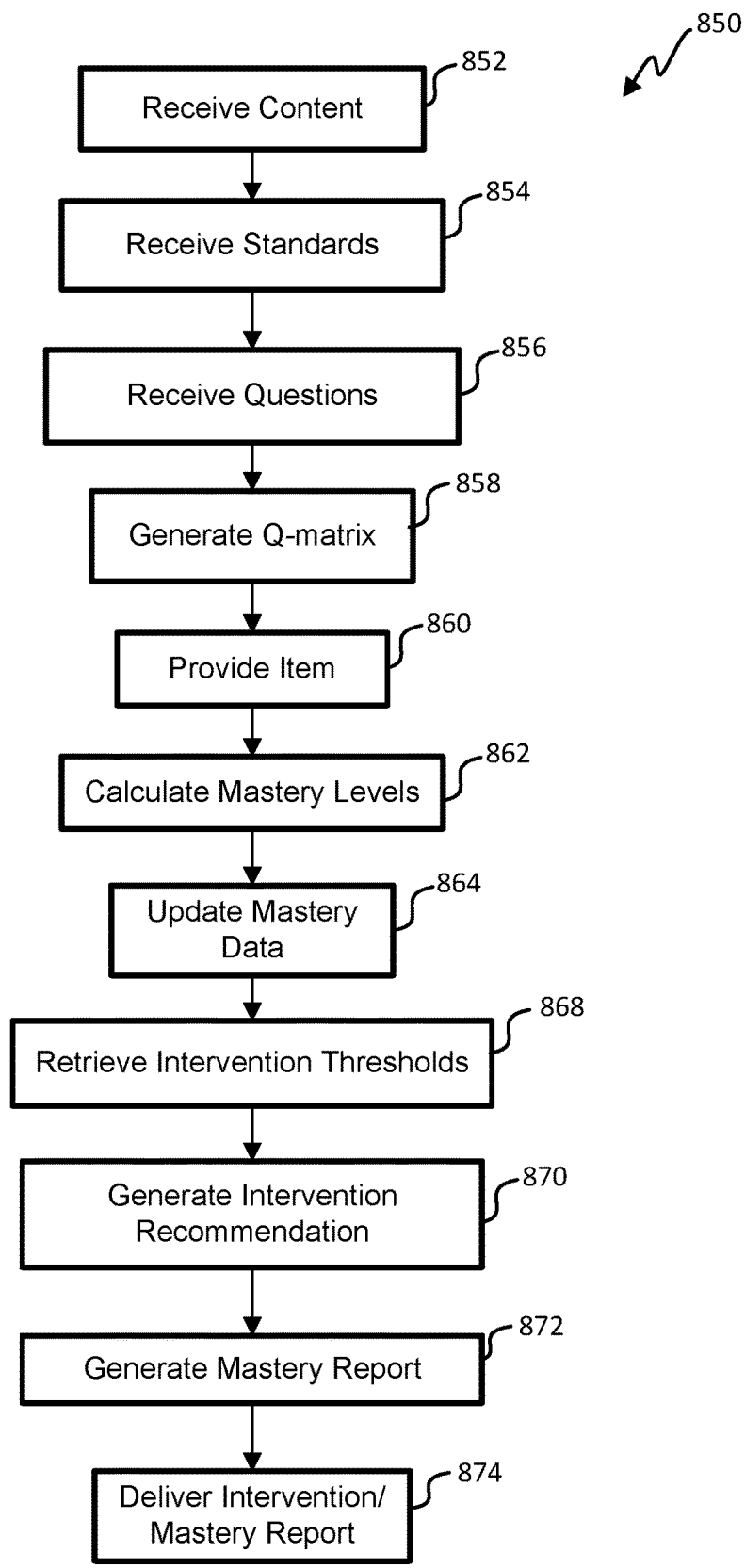
FIG. 16 is a flowchart illustrating one embodiment of a process for automatic delivery of an intervention.

With reference now to FIG. 16, a flowchart illustrating one embodiment of a process 820 for automatic delivery of an intervention is shown. The process 850 can be performed as a part of, or in addition to the process 700 of FIG. 13. The process 850 can be performed by all or portions of the content distribution network 100.

The process begins at block 852 wherein content is received, at block 854 wherein standards and/or information relating to standards are received, and a block 856 wherein questions or items are received. In some embodiments, the received content can comprise information corresponding to instructional units. This content, standards, and/or items can, in some embodiments, be received from the content server 112 and/or from the database server 104 and specifically from the content library database 303.

After the receipt of the content, standards, and/or questions, the process 850 proceeds to block 858 wherein the Q-matrix is generated. In some embodiments, the generation of the Q-matrix can include the linking of standards or portions of standards to instructional units and items or questions in a multidimensional database which can be, for example, three-dimensional database. In some embodiments, the Q-matrix can be generated by the server 102. In some embodiments, and as part of the step of block 858, the Bayesian network can be generated, which Bayesian network can reflect the connections between instructional units, items, and standards or portions of standards identified in the Q-matrix. In some embodiments, the Bayesian network can comprise a plurality of nodes including parent nodes in child nodes that can be linked by edges and associated conditional probabilities. The Bayesian network can be generated based on the Q-matrix and previously collected response data to the items identified in the Q-matrix.

After the generation of the Q-matrix, the process 850 proceeds to block 860 wherein one or several items are provided. In some embodiments, these one or several items can be provided to a recipient-user in the form of an interim assessment after the completion of one or several instructional units associated with those one or several items. In some embodiments, the items can be selected by the server 102 and can be provided to the user device 106 via the communications network 120. The user device 106 can then provide those one or several items to the recipient-user via a user interface that can be, for example, generated by the I/O subsystem 526.

In some embodiments, the providing of the items in block 860 can further include receiving responses to the provided items and evaluating those responses. In some embodiments, these responses can be received by the server 102 from the user device 106 via the communication network 120. These responses can be evaluated by the server 102, and specifically by the evaluation system 406 based on information retrieved from the database server 104. The result of the evaluation of the responses can be used as evidence to update probabilities associated with one or several nodes of the Bayesian network. Specifically, and as shown in FIG. 11, a correct response can result in updating the probability of correctly responding to a node to 100% and an incorrect response can result in updating the probability of correctly responding to a node 20%.

After the item has been provided, the process 850 proceeds block 862 wherein mastery levels are determined and/or calculated. In some embodiments, this step is performed by the Bayesian network based on the update probabilities associated with one or several child nodes in the Bayesian network. In some embodiments, for example, the updated probabilities associated with the one or several child nodes can be applied to the parent node via the conditional probabilities linking the child nodes and the parent node. In some embodiments the mastery level can be a probability of the student having mastered and/or attained the standard or portion of the standard associated with the parent node. The mastery level can be calculated by the server 102.

After the mastery levels been calculated, the process 850 proceeds to block 864 wherein mastery data is updated. In some embodiments, this can include updating data stored in the database server identifying the probability of the student having mastered the parent node associated with the mastery level calculated in block 862. In some embodiments, this update can be performed in the user profile database 301, the content library database 303, and/or the model database 309.

After the mastery data has been updated, the process 850 proceeds to block 868 wherein one or several interventions thresholds are retrieved. In some embodiments, these interventions thresholds can be retrieved from the database server. These thresholds can delineate between acceptable probabilities of mastery and unacceptable probabilities of mastery. In some embodiments, these interventions thresholds can be compared to the mastery levels and/or probabilities of mastery calculated in block 862.

If it is determined based on the comparison of the interventions thresholds and the calculated mastery levels that an intervention is desired, then the process can proceed to block 870 and an intervention recommendation can be generated. In some embodiments the intervention recommendation can identify one or several instructional units and/or one or several pieces of content from one or several instructional units for presentation to the recipient-user. In some embodiments, this can include one or several videos, audio clips, images, simulations, practices or practice problems, homework assignments, written content, or the like. In some embodiments, the intervention recommendation can be generated by the server 102.

After the intervention recommendation has been generated, or if no intervention is desired, the process 850 proceeds to block 872 wherein a mastery report is generated. In some embodiments, the mastery report can identify the standard or portions of the standard relevant to the student and attained mastery or on attained mastery of the standard or portions thereof. In some embodiments, the mastery report can only include the standard or portions of the standard relevant to the provided items and/or to the provided interim assessment. The mastery report can be generated by the server 102. In some embodiments, the mastery report can identify all or portions of the standard for which the user did not achieve mastery and/or for which the intervention recommendation was generated. In some embodiments, this can include identifying one or several parent nodes for which mastery is not achieved. In some embodiments, the mastery report can include information relating to the user efforts associated with the failed mastery such as, for example, the number provided responses, the number and/or percent of incorrect responses, or the like.

After the mastery report has been generated, the process 850 proceeds to block 874 wherein the intervention and/or the mastery report is delivered. In some embodiments in which an intervention recommendation is generated, the intervention recommendation can be delivered to the recipient-user via the user device 106 and/or to the presenter of the recipient-user via the supervisor device 110. Similarly, in embodiments in which a mastery report is generated, the mastery report can be delivered to the recipient-user via the user device 106 and/or to the presenter of the recipient-user via the supervisor device 110. In some embodiments, for example, the communication comprising the mastery report and/or the intervention recommendation can be an alert including the features and/or capabilities of the above-discussed alerts.

In some embodiments, and in response to a provided intervention, one or several responses can be received, which responses can be evaluated according to block 860. In such an embodiment, the process 850 can return to block 860 and can proceed as outlined above.

Figure 17:
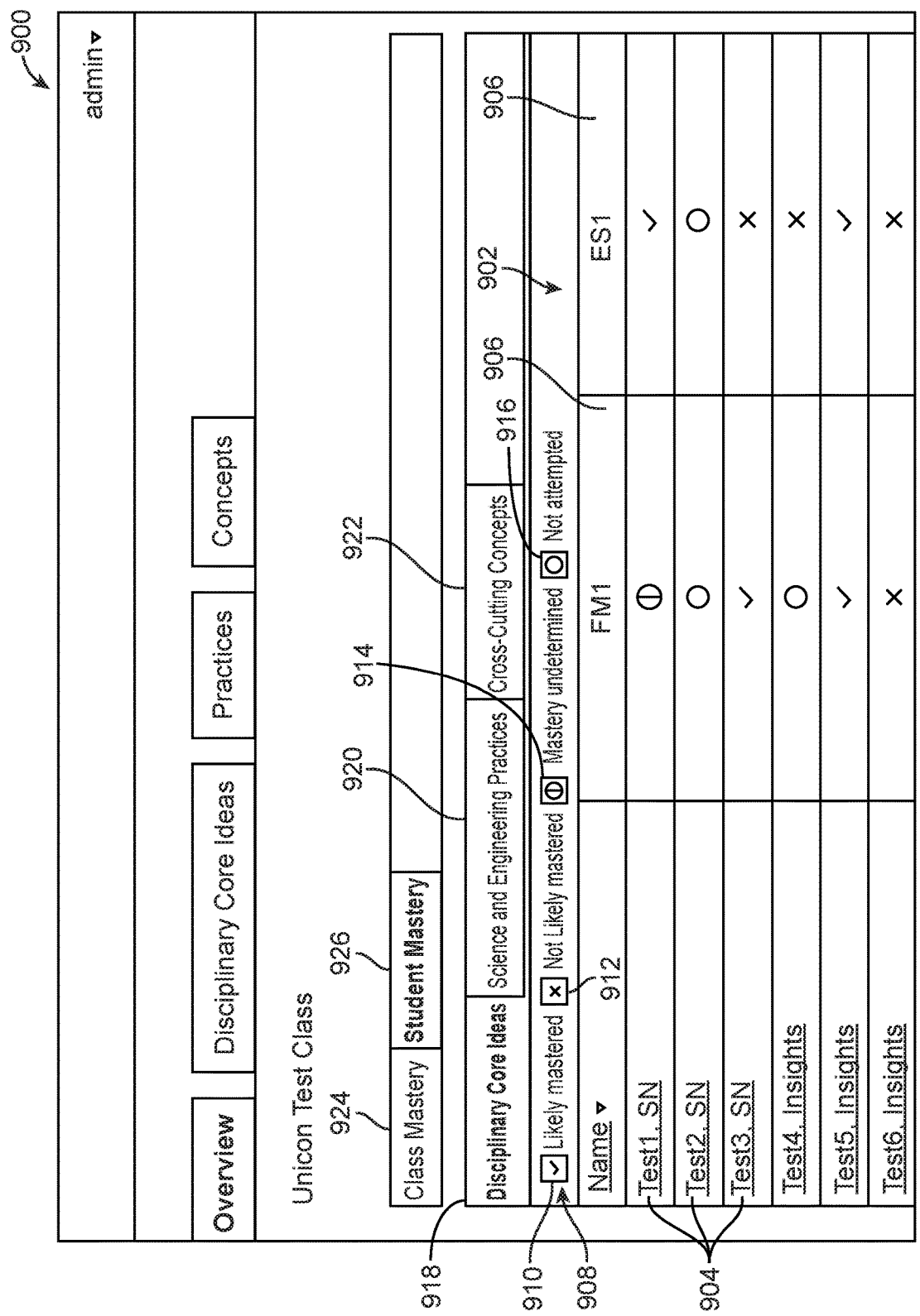
FIG. 17 is a schematic illustration of a user interface displaying mastery determined based on the network.

One embodiment of a mastery report as delivered by a mastery interface 900 is shown in FIG. 17. In some embodiments, the mastery interface 900 can be generated by a user device 106 and/or supervisor device upon receipt of the mastery report, and in some embodiments, the mastery report in the form of an alert that can include a link that, when selected, launches the application or navigates a web-browser of the device of the selector of the link to page or portal associated with the alert and/or that launches the mastery interface 900.

As seen in FIG. 17, the mastery interface 900 can include a mastery window 902 in which the mastery report can be delivered. In some embodiments, the mastery window 902 can include rows 904 identifying one or several tests such as one or several interim assessments, and one or several columns 906 identifying one or several standards and/or portions of standards. The mastery window 902 can further include a plurality of icons 908 identifying a mastery outcome of the one or several standards and/or portions of standards identified in the one or several columns 906 vis-à-vis provide the one or several evaluation identifying in the one or several rows 904. These icons 908 can include a first icon 910 indicating likely mastery, a second icon 912 indicating likely non-mastery, a third icon 914 indicating undetermined mastery, and a fourth icon indicating that a mastery determination was unattempted. In some embodiments, one of these icons can be displayed in each row, column intersection to indicate whether mastery of the standard and/or portion of the standard identified by the intersecting row was indicated as mastered by the evaluation and/or item indicated by the intersecting column.

The mastery window 902 can further include tabs 918-922 that can enable the toggling between views. These tabs can include a first tab 918, a second tab 920, and a third tab 922. In some embodiments, the first tab 918 can correspond to disciplinary core ideas, the second tab 920 can correspond to science and engineering practices, and the third tab 922 can correspond to cross-cutting concepts. In some embodiments, the display of the mastery window 902 can change based on which of the tabs 918-920 is selected.

The mastery interface 900 can further include mastery report buttons 924, 926. In some embodiments, these mastery report buttons 924, 926 can include a first report button 924 and a second report button 926. In some embodiments, manipulation of the first report button 924 can result in the display of a mastery report for a first one or several recipient-users, such as, for example, a class, and manipulation of the second report button 926 can result in the display of a mastery report for a second one or several recipient-users, such as, for example, a single student.

In some embodiments, the mastery report can be automatically displayed subsequent to receipt of a communication comprising the mastery report by the user device 106 and/or the supervisor device 110. In some embodiments, for example, the communication comprising the mastery report can be an alert including the features and/or capabilities of the above-discussed alerts.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for automated Bayesian network-based intervention delivery, the system comprising:
   a memory comprising a Q-matrix comprising data identifying a relationship between at least a portion of a standard and at least one item of an assessment;
   a Bayesian network comprising a plurality of parent nodes, wherein each parent node is linked to a plurality of child evidence nodes and each parent node corresponds to at least a portion of a skill; and
   at least one server configured to:
     identify a user;
     retrieve user data;
     provide a first interim assessment comprising a first plurality of items, wherein each of the items corresponds to a child evidence node in the Bayesian network;
     calculate a mastery probability of a parent node, in the plurality of parent nodes, based on child evidence nodes linked to the parent node and according to the Q-matrix; and
     generate and deliver an intervention when the mastery probability of the parent node drops below a predetermined value.

2. The system of claim 1, wherein the predetermined value comprises an intervention threshold, and wherein the at least one server is configured to:

retrieve the intervention threshold; and compare the mastery probability to the intervention threshold.

3. The system of claim 2, wherein the intervention comprises at least one instructional unit.

4. The system of claim 3, wherein the at least one server is further configured to generate a mastery report.

5. The system of claim 4, wherein the mastery report identifies the parent node for which the user did not achieve mastery.

6. The system of claim 5, wherein the mastery report comprises a mastery window identifying the user and comprising at least one icon identifying a mastery of the user.

7. The system of claim 6, wherein the mastery window further comprises an identifier of a portion of a standard associated with the at least one icon identifying the mastery of the user.

8. The system of claim 7, wherein the mastery of the user corresponds to the mastery probability of the user.

9. The system of claim 8, wherein the mastery report comprises a link directing launch of a mastery interface.

10. A method for automated Bayesian network-based intervention delivery, the method comprising:

identifying a user with at least one server;

retrieving user data from a user profile database in memory coupled with the at least one server;

creating a Bayesian network by linking each parent node, in a plurality of parent nodes, to a plurality of child evidence nodes, wherein each parent node corresponds to at least a portion of a skill;

providing with the at least one server a first interim assessment comprising a first plurality of items, wherein each of the items corresponds to a child evidence node in the Bayesian network;

calculating with the at least one server a mastery probability of a parent node, in the plurality of parent nodes, based on child evidence nodes linked to the parent node and according to a Q-matrix comprising data identifying a relationship between at least a portion of a standard and at least one item of an assessment; and generating and delivering with the at least one server an intervention when the mastery probability of the parent node drops below a predetermined value.

11. The method of claim 10, wherein the predetermined value comprises an intervention threshold, and wherein the at least one server is configured to:

retrieve the intervention threshold; and compare the mastery probability to the intervention threshold.

12. The method of claim 11, wherein the intervention comprises at least one instructional unit.

13. The method of claim 12, further comprising generating a mastery report.

14. The method of claim 13, wherein the mastery report identifies the parent node for which the user did not achieve mastery.

15. The method of claim 14, wherein the mastery report comprises a mastery window identifying the user and comprising at least one icon identifying a mastery of the user.

16. The method of claim 15, wherein the mastery window further comprises an identifier of a portion of a standard associated with the at least one icon identifying the mastery of the user.

17. The method of claim 16, wherein the mastery of the user corresponds to the mastery probability of the user.

18. The method of claim 17, wherein the mastery report comprises a link directing launch of a mastery interface.

* * * * *